United States Patent
Boyle et al.

(10) Patent No.: US 10,200,325 B2
(45) Date of Patent: *Feb. 5, 2019

(54) SYSTEM AND METHOD OF DELIVERING CONFIDENTIAL ELECTRONIC FILES

(71) Applicant: Shazzle LLC, Braintree, MA (US)

(72) Inventors: Clifford F. Boyle, Scottsdale, AZ (US); Robert E. McGill, Rumson, NJ (US); Igor V. Slepinin, West Hartford, CT (US)

(73) Assignee: SHAZZLE LLC, Braintree, MA (US)

( * ) Notice: Subject to any disclaimer, the term of this patent is extended or adjusted under 35 U.S.C. 154(b) by 23 days.

This patent is subject to a terminal disclaimer.

(21) Appl. No.: 14/467,359

(22) Filed: Aug. 25, 2014

(65) Prior Publication Data

US 2015/0134948 A1 May 14, 2015

Related U.S. Application Data

(63) Continuation-in-part of application No. 13/097,922, filed on Apr. 29, 2011, now Pat. No. 8,819,412.
(Continued)

(51) Int. Cl.
*H04L 12/58* (2006.01)
*H04L 29/06* (2006.01)

(52) U.S. Cl.
CPC ............. *H04L 51/14* (2013.01); *H04L 51/28* (2013.01); *H04L 51/38* (2013.01);
(Continued)

(58) Field of Classification Search
CPC ............... H04L 63/029; H04L 63/083; H04L 29/06625; H04L 61/10; H04L 67/104;
(Continued)

(56) References Cited

U.S. PATENT DOCUMENTS

| 4,720,784 A | | 1/1988 | Radhakrishnan et al. |
| 5,661,781 A | * | 8/1997 | DeJager ................ H04M 3/537 379/114.15 |

(Continued)

FOREIGN PATENT DOCUMENTS

| JP | 2004-288169 A | 10/2004 |
| KR | 10-2007-0092196 A | 9/2007 |

OTHER PUBLICATIONS

Reticular Systems, Inc., "P-Mail—Private Email and Instant Messaging with Intelligent Software Agents," Version 1.0, Rev. 0, pp. 1-10, Aug. 27, 1999.

*Primary Examiner* — Nelson Giddins
(74) *Attorney, Agent, or Firm* — J.A. Lindeman & Co., PLLC

(57) ABSTRACT

A sending computer (sender) delivers private messages over a network via dynamically established encrypted channels where no copies of the message are persisted on third party computers. Private messages are routed dynamically based on membership status of the receiving computer (receiver) and direct addressability status of the sender and receiver. The system determines membership status of the receiver and provides a notification message and delivery link to the receiver when the receiver is not a member of the private network. When the receiver is a member, direct addressability of sender and receiver is determined, and the message is delivered directly to the receiver over an encrypted channel when the sender is directly addressable. When the sender is not directly addressable, the encrypted channel between the sender and receiver is established through a third party relay without persisting a copy of the private message on the third party relay.

22 Claims, 13 Drawing Sheets

Related U.S. Application Data

(60) Provisional application No. 61/329,974, filed on Apr. 30, 2010.

(52) U.S. Cl.
CPC ........ *H04L 63/0428* (2013.01); *H04L 51/043* (2013.01); *H04L 63/083* (2013.01)

(58) Field of Classification Search
CPC ..... H04L 67/06; H04L 67/24; H04L 67/1091; H04L 67/83; H04L 67/322; H04L 51/00; H04L 51/04; H04L 51/043; H04L 51/20; H04L 51/24; H04L 51/26; H04L 51/28; H04L 51/38; H04L 51/34; H04L 63/12; H04L 65/00
See application file for complete search history.

(56) References Cited

U.S. PATENT DOCUMENTS

| | | | |
|---|---|---|---|
| 6,178,505 B1 | 1/2001 | Schneider et al. | |
| 6,499,108 B1 * | 12/2002 | Johnson | G06F 11/2294 380/28 |
| 6,801,998 B1 | 10/2004 | Hanna et al. | |
| 6,816,887 B1 | 11/2004 | Shaw et al. | |
| 6,978,367 B1 | 12/2005 | Hind et al. | |
| 7,082,536 B2 | 7/2006 | Filipi-Martin et al. | |
| 7,155,479 B2 | 12/2006 | Cover et al. | |
| 7,222,156 B2 | 5/2007 | Gupta et al. | |
| 7,254,137 B2 | 8/2007 | Civanlar et al. | |
| 7,356,133 B2 * | 4/2008 | Lagadec | H04M 3/42008 379/210.03 |
| 7,392,281 B1 | 6/2008 | Kanojia et al. | |
| 7,406,481 B2 | 7/2008 | Saha et al. | |
| 7,529,937 B2 | 5/2009 | Tribble et al. | |
| 7,613,919 B2 | 11/2009 | Bagley | |
| 7,640,427 B2 | 12/2009 | Callas et al. | |
| 7,673,048 B1 * | 3/2010 | O'Toole, Jr. | H04L 12/4633 370/229 |
| 7,676,675 B2 | 3/2010 | Billharz et al. | |
| 7,698,558 B2 | 4/2010 | Tomkow | |
| 7,702,107 B1 * | 4/2010 | Messing | H04L 51/066 380/259 |
| 7,778,187 B2 | 8/2010 | Chaturvedi et al. | |
| 7,792,072 B2 | 9/2010 | Devarapalli et al. | |
| 7,814,208 B2 | 10/2010 | Stephenson et al. | |
| 7,818,435 B1 | 10/2010 | Jellinek | |
| 7,844,813 B2 | 11/2010 | Henson et al. | |
| 7,849,140 B2 * | 12/2010 | Abdel-Aziz | H04L 51/066 709/201 |
| 7,899,932 B2 * | 3/2011 | Takeda | H04L 29/12066 709/230 |
| 7,936,779 B2 | 5/2011 | Risberg et al. | |
| 7,949,138 B2 * | 5/2011 | Schwartz | G06F 21/31 380/286 |
| 7,984,496 B2 | 7/2011 | Loh | |
| 8,001,187 B2 * | 8/2011 | Stochosky | H04L 12/1813 709/205 |
| 8,032,750 B2 | 10/2011 | Swedor | H04L 63/0442 709/206 |
| 8,074,066 B2 | 12/2011 | Brown et al. | |
| 8,150,397 B2 | 4/2012 | Khetawat et al. | |
| 8,176,131 B2 | 5/2012 | Masonis et al. | |
| 8,200,827 B1 * | 6/2012 | Hunyady | H04L 63/029 709/217 |
| 8,266,421 B2 * | 9/2012 | Sidman | H04L 29/12386 380/255 |
| 8,316,090 B2 * | 11/2012 | Addante | H04L 51/08 709/206 |
| 8,316,226 B1 | 11/2012 | Kshirsagar et al. | |
| 8,327,157 B2 * | 12/2012 | West | H04L 51/08 713/189 |
| 8,484,456 B2 * | 7/2013 | Low | G06Q 20/382 705/64 |
| 8,682,979 B2 * | 3/2014 | LeVasseur | H04L 63/126 709/206 |
| 8,688,790 B2 * | 4/2014 | LeVasseur | H04L 51/12 709/203 |
| 8,732,250 B2 | 5/2014 | Nussey et al. | |
| 8,756,287 B2 | 6/2014 | Kobayashi | |
| 8,782,415 B2 | 7/2014 | Tomkow | |
| 8,972,717 B2 * | 3/2015 | Cook | G06Q 10/107 713/153 |
| 9,166,937 B2 * | 10/2015 | Kallman | G06Q 10/107 |
| 2002/0035605 A1 | 3/2002 | McDowell et al. | |
| 2002/0059529 A1 | 5/2002 | Beton et al. | |
| 2002/0098840 A1 * | 7/2002 | Hanson | H04L 1/188 455/435.3 |
| 2003/0105812 A1 * | 6/2003 | Flowers, Jr. | H04L 63/029 709/203 |
| 2003/0131061 A1 | 7/2003 | Newton et al. | |
| 2003/0219104 A1 * | 11/2003 | Malik | H04M 3/533 379/88.11 |
| 2004/0139314 A1 * | 7/2004 | Cook | G06Q 10/107 713/151 |
| 2004/0203947 A1 * | 10/2004 | Moles | H04W 4/14 455/466 |
| 2004/0249973 A1 * | 12/2004 | Alkhatib | H04L 12/4641 709/245 |
| 2005/0091319 A1 * | 4/2005 | Kirsch | H04L 51/12 709/206 |
| 2005/0097177 A1 * | 5/2005 | McUmber | H04L 51/12 709/206 |
| 2005/0138192 A1 * | 6/2005 | Encarnacion | H04L 12/2812 709/230 |
| 2005/0228876 A1 * | 10/2005 | Malik | G06Q 10/00 709/223 |
| 2005/0233737 A1 * | 10/2005 | Lin | H04L 51/04 455/416 |
| 2005/0249134 A1 * | 11/2005 | Lin | H04L 51/04 370/278 |
| 2006/0009213 A1 * | 1/2006 | Sturniolo | H04W 8/02 455/426.1 |
| 2006/0010165 A1 | 1/2006 | Gee | |
| 2006/0053280 A1 | 3/2006 | Kittle et al. | |
| 2006/0123079 A1 * | 6/2006 | Sturniolo | H04W 80/045 709/203 |
| 2006/0123476 A1 | 6/2006 | Yaghmour | |
| 2006/0230163 A1 | 10/2006 | Fish et al. | |
| 2006/0242244 A1 * | 10/2006 | Logue | G06Q 10/107 709/206 |
| 2007/0005714 A1 * | 1/2007 | LeVasseur | H04L 51/34 709/206 |
| 2007/0005716 A1 * | 1/2007 | LeVasseur | H04L 63/306 709/206 |
| 2007/0078965 A1 * | 4/2007 | Shimamura | H04L 51/043 709/224 |
| 2007/0130464 A1 * | 6/2007 | Swedor | H04L 63/0442 713/170 |
| 2007/0150941 A1 * | 6/2007 | Jachner | H04L 67/24 726/5 |
| 2007/0204150 A1 * | 8/2007 | Jokela | H04L 29/12018 713/161 |
| 2008/0045234 A1 | 2/2008 | Reed | |
| 2008/0098071 A1 * | 4/2008 | Jones | G06Q 10/107 709/206 |
| 2008/0109560 A1 * | 5/2008 | Ferguson | G06F 17/30176 709/238 |
| 2008/0125081 A1 * | 5/2008 | Aaltonen | H04W 12/08 455/405 |
| 2009/0006851 A1 | 1/2009 | Freeman et al. | |
| 2009/0144380 A1 * | 6/2009 | Kallman | G06Q 10/107 709/206 |
| 2009/0150675 A1 | 6/2009 | Cook | |
| 2009/0157513 A1 * | 6/2009 | Bonev | G06F 17/30029 705/14.69 |
| 2009/0157693 A1 * | 6/2009 | Palahnuk | G06Q 30/00 |
| 2009/0210497 A1 * | 8/2009 | Callanan | H04L 51/04 709/206 |
| 2009/0222450 A1 * | 9/2009 | Zigelman | H04L 67/06 |

(56) References Cited

U.S. PATENT DOCUMENTS

| | | | |
|---|---|---|---|
| 2009/0253410 A1 | 10/2009 | Fitzgerald et al. | |
| 2010/0023757 A1* | 1/2010 | Nguyen-Huu | H04L 9/083 713/156 |
| 2010/0036813 A1 | 2/2010 | Cameron et al. | |
| 2010/0077037 A1* | 3/2010 | Turakhia | H04L 29/1215 709/206 |
| 2010/0211783 A1* | 8/2010 | Lukaszyk | H04L 51/12 713/168 |
| 2010/0217979 A1 | 8/2010 | Yaghmour | |
| 2010/0261488 A1* | 10/2010 | Little | H04L 12/1886 455/466 |
| 2011/0009133 A1* | 1/2011 | Hung | H04L 12/1886 455/466 |
| 2011/0010340 A1* | 1/2011 | Hung | H04L 12/1886 707/623 |
| 2011/0066841 A1* | 3/2011 | Goodrow | H04L 43/0894 713/150 |
| 2011/0113109 A1* | 5/2011 | LeVasseur | H04L 51/12 709/206 |
| 2011/0196913 A1* | 8/2011 | Acharya | H04L 67/24 709/203 |
| 2011/0225246 A1* | 9/2011 | Bayles | G06Q 10/107 709/206 |
| 2011/0307694 A1 | 12/2011 | Broustis et al. | |
| 2012/0124660 A1* | 5/2012 | Wang | H04L 12/4641 726/12 |
| 2012/0233287 A1* | 9/2012 | Queru | H04L 67/06 709/217 |
| 2012/0324009 A1* | 12/2012 | Lee | H04L 12/588 709/204 |
| 2013/0019280 A1 | 1/2013 | Larson et al. | |
| 2013/0170471 A1* | 7/2013 | Nix | H04W 36/00 370/331 |
| 2014/0068750 A1* | 3/2014 | Tjahjono | H04L 63/029 726/15 |
| 2014/0089432 A1* | 3/2014 | Lin | H04L 51/02 709/206 |
| 2014/0089441 A1* | 3/2014 | Lukaszyk | H04L 51/043 709/206 |
| 2014/0122883 A1* | 5/2014 | LeVasseur | H04L 63/126 713/170 |
| 2014/0344382 A1* | 11/2014 | Schmid | G06Q 10/107 709/206 |
| 2015/0120909 A1* | 4/2015 | Karthikeyan | H04L 61/1511 709/224 |
| 2015/0134948 A1* | 5/2015 | Boyle | H04L 51/14 713/152 |
| 2015/0244663 A1* | 8/2015 | Cook | G06Q 10/107 713/153 |
| 2015/0312352 A1* | 10/2015 | Shamilian | H04L 67/141 726/6 |
| 2015/0356634 A1* | 12/2015 | Kallman | G06Q 10/10 705/51 |

* cited by examiner

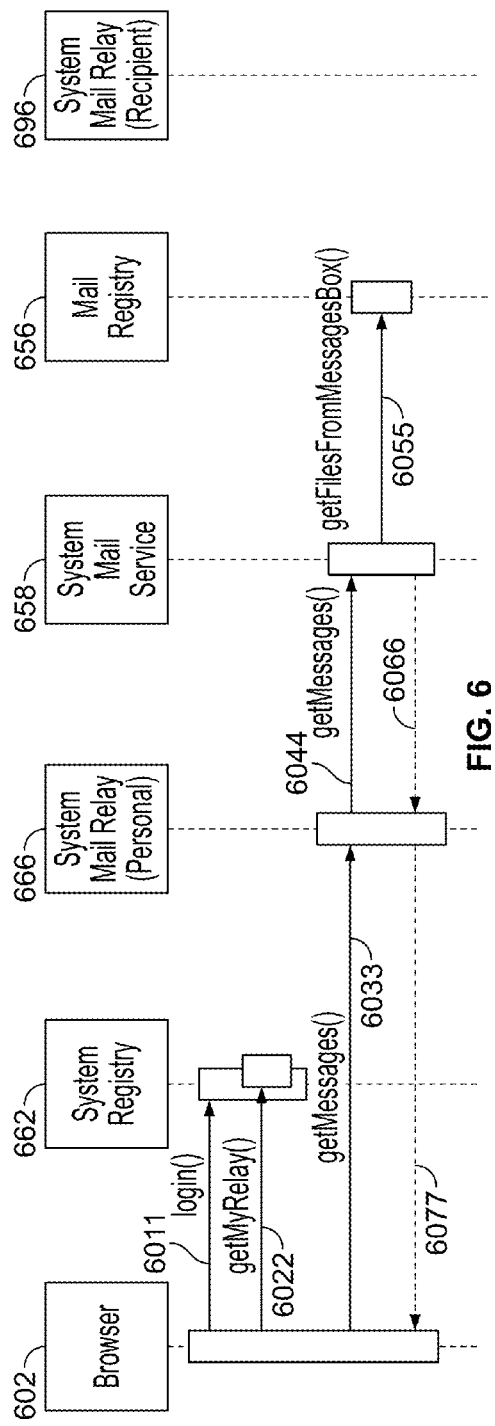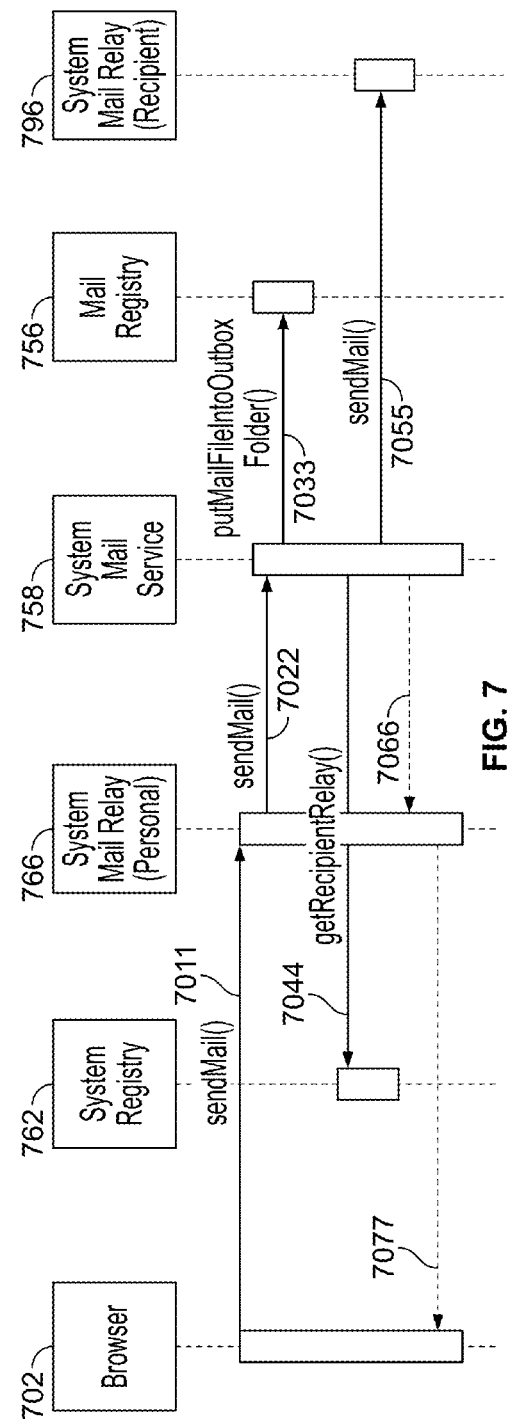

SYSTEM AND METHOD OF DELIVERING CONFIDENTIAL ELECTRONIC FILES

CROSS-REFERENCE TO RELATED APPLICATIONS

This application is a continuation-in-part application of U.S. patent application Ser. No. 13/097,922 filed on Apr. 29, 2011. This application claims priority to U.S. patent application Ser. No. 13/097,922 filed on Apr. 29, 2011, and to U.S. Provisional Patent Application No. 61/329,974, filed on Apr. 30, 2010. The entire contents of these applications are incorporated herein by reference.

TECHNICAL FIELD

This technology generally relates to computer security and more specifically to electronically delivering confidential documents, messages, and attachments.

BACKGROUND

Electronic mail (e-mail) systems are used to compose, send, and receive messages between computing devices over a computer network. Authors and recipients use e-mail systems to exchange digital messages over computer networks such as the Internet. E-mail may be the most heavily used feature of the Internet. Millions of people send and receive e-mail every day. When a user sends an email message, an Internet standard for electronic mail, such as Simple Mail Transfer Protocol (SMTP) sends the message to a mail server for relaying. The transmitted message is broken into packets over a transmission control protocol (TCP) connection, and the Internet protocol (IP) delivers the packets to the proper location(s), and the TCP then reassembles the message at the receiving computing device so that a recipient can read the message.

E-mail messages can include one or more attachments, in the form of documents or files. When sending email messages with attached documents or files, the attachments and files are often encoded using an Internet standard such as Multipurpose Internet Mail Extensions (MIME). MIME extends the format of e-mail to support non-standard character sets, non-text attachments, messages bodies with multiple parts, header information, and the like. When the email message is received by the recipient, the attachment(s) are decoded in a similar fashion.

In the past, electronic mail transmission and delivery was not secure. Transmission and delivery of email messages was often routed through intermediate relay points, such as mail submission agents, DNS servers, message transfer agents, message delivery agents, and other servers used to bridge smaller networks. Often, persistent copies of the email message are made and potentially stored at the intermediate relay points. Nefarious characters could read email messages when these messages traveled on public networks. Other ne'er do wells could intercept email messages and change the contents of the message between the time the sender composes the message and the time the recipient reads it. Encrypting email messages by scrambling the message provided a measure of success in ensuring that only the sender and receiver could read the messages. One type of encryption uses software keys with which to encrypt email messages. The keys include a public key and a private key. The public key is available for anyone to use to encrypt the email message when sending it, but only a recipient that holds a private key is able to decrypt the email message to read it. In practice, the communication can start with one side generating and sending a symmetric "session" key encrypted with a known public key of a recipient. Only the recipient can decrypt this message, so the session key is "safe" as it is transmitted in encrypted form. Once the recipient receives the session key, the sender and the recipient can use the session key to apply the encryption algorithm to send and receive email messages to and from each other. The email messages are sent over the computer network. While the email is on the computer network, the email is encrypted so that any shady character that reads the email will not be able to understand it.

When verifying that the contents of a message were written by a particular user and unaltered by any other user, it is necessary to agree upon a signature and hash algorithm. The signature is used to verify the authenticity of the message, and the hash algorithm is used to verify the integrity of the message.

For signature algorithms, asymmetric algorithms are typically used. These algorithms utilize a public key and a secret key. A signature algorithm combined with a secret key allows someone to generate a digital signature for the contents of a message. The party that anticipates receiving an email message creates the public key and the associated secret key. When another party wants to send a secure email to the creator of the keys, that party encrypts the email using the recipient's public key and sends the message. The recipient decrypts the message using the private key. The need to exchange asymmetric key pair information prior to sending a secure email creates network friction that has restricted secure email adoption to a very small specialized market. A signature algorithm combined with a public key allows someone to verify the digital signature for a message. Signature algorithms are one way functions. A user cannot reconstruct the input to a signature function by looking at its output.

Hash algorithms are also called message digest algorithms. These algorithms compute a checksum on their input; no keys are involved. Hash algorithms are also one way functions, and a robust hash algorithm is one in which very similar inputs produce dramatically different outputs. For example, if even a single bit of the message file is altered or corrupted in transit, the hash value should be very different.

Digital certificates also provide an additional level of security. Digital certificates use a digital signature to bind a public key with an identity. The certificate can be used to verify that a public key belongs to a particular individual and that individual is who he says he is. Digital certificates place information on a sender or a recipient's computer and use encryption to create a unique digital certificate for that person from the stored information. When that person goes to a web site or sends an email, the digital certificate is presented to the site or attached to the email, and the certificate verifies that the user is who he claims to be.

However, not all email programs are good at reading signed or encrypted email. An additional encryption/decryption piece of software is required to provide this functionality. Further, if a recipient does not have a valid certificate, or has conflicting or unsupported encryption capabilities, the email message will not be properly received or viewed.

Also, many e-mail systems and methods do not provide verification that an electronic message was received by the intended recipient nor do they provide the sender of the email with an authentication message to indicate that the delivered message was not intercepted or altered. In these current email systems, the message sender cannot demonstrate that the intended receiver actually received the encrypted message sent. The server from which the email was originally sent has to trust that the system and user requesting an encryption key associated with the email previously transmitted actually has the message that corresponds to the encryption key. Confidential email with suitable tracking verification and authentication is not provided. Additionally, private messaging—that is, the ability to send messages without others knowing you are doing so—is not possible with current messaging schemes.

A secure email program should be nonintrusive and transparent. Different approaches have been used in the past to provide secure email transmission and delivery.

SUMMARY

In this disclosure, many of the examples discuss systems and methods used to provide, send, and deliver documents between computing devices on disparate networks. However, it should be understood that the systems and techniques in accordance with the claimed invention can also provide secure transmission, reception, and storage of electronic files and documents within a single computer or a single computer network, depending upon the sending computer and the receiving computer. Additionally, multiple receiving computers can be employed, such as when a secure electronic mail message is sent to multiple recipients, for example.

One example of the claimed invention is a system and method for delivering confidential e-mail messages and attachments by establishing a direct path from the receiving computer to the sender through an encrypted line so that no third parties receive permanent or persistent copies of the confidential documents. The system and method establishes a direct path dynamically so that the receiving computer does not need to be a member of the sender's peer network, such as a private messaging network or the like. Peer networks are collections of computers that are registered on a central server or servers so that direct connections can be made between two of the registered computers.

An encrypted line (encrypted channel) is a communications path that carries an encrypted document. A dynamically established encrypted line is a communications path that is established after the system checks to see if a receiving computer is directly addressable. That is, the delivery address of the receiving computer is resolved at the time of transmission of the confidential message. The dynamically established encrypted line then carries the encrypted electronic document.

In the case of the claimed invention, private messages can also be sent between sending and receiving computers that are not on the same peer network. In one example, the receiving computer receives a notification with a link that establishes a direct connection to the sending computer. This system and method provides a high degree of privacy by maintaining physical possession of the persisted data (e.g., email messages and attachments) strictly with the sending computer and the receiving computer. Because no copies of the e-mail message or attachment(s) are ever persisted with outside parties, there is no need for encryption at rest. As such, there is no need for cumbersome asymmetrical key encryption.

The systems and methods of the claimed invention provide a secure manner for delivering confidential electronic files and documents, such as e-mail messages and attachments, by notifying a recipient that a message is waiting to be retrieved. Identification information is received from the recipient and verified by the sending computer. A specific verification protocol can be identified and employed. Once the recipient is verified, access instructions are provided to the recipient. A direct connection is established dynamically, and the secure private transmission and delivery of the private electronic document is effected via the direct connection.

The systems and methods of the claimed invention enable communication with parties in the network or out of the network. To maintain privacy, the claimed invention bypasses static, directly addressable email servers that are not in the sender's physical possession and so does not use the World Wide Web like Client/Server email architecture does. To solve this problem, the claimed invention focuses on a computing device that is in the user's physical possession, so only users have persistent copies of the emails sent. The devices act as mail servers and provide reliability by their always-on, or nearly always-on characteristics. For example, a smartphone is one consumer device to be nearly always-on, and so the system of the claimed invention supports the routing of email through smartphones. Smartphones are different from static computers in that they are sometimes directly addressable and at other times are not.

Direct addressability simply means that a device can receive electronic messages directly from devices outside of the local network. Some devices exist behind firewalls or other networking hardware that prevents devices outside the local network from communicating with them directly unless they have first requested a response from the out-of-network device. A classic example of a device that is not directly addressable is a PC that is behind a firewall implementing Network Address Translation (NAT). These PCs cannot receive any electronic messages from devices outside of the firewall. They can only receive electronic messages after they have requested a message (in response to their request). Likewise, phones connected via a cellular network are not directly addressable so they cannot receive a request to deliver an email message from a recipient directly from the recipient. They must instead use a relay device to connect the sending phone and the recipient.

The system and method of the claimed invention uses relays so that senders can use non-directly addressable devices, so that a universal set of smart phones, PC's, Macs, and many other devices other than just a static internal web server are supported. The sending computer of the claimed invention is under the sender's physical possession, which allows the receiver to pull the message in a peer-to-peer path from the sending computer with no intermediate copies persisted. In this way the system and method of the claimed invention maintains strict privacy, persisting messages only on sender and receiver's computing devices. Likewise, the system and method of the claimed invention also supports sending to a universal set of recipients either inside or out of the mail service peer network.

With the system and method of the claimed invention, a sending computer connects to the registry and requests connecting information for the receiving computer, which information contains receiving computer's external IP, local IP, certificate, direct addressability flag and (if not directly addressable) relay IP and relay session. If the receiving computer is on the same local network as the sending computer, a local IP will be used to create a connection. Otherwise, if the receiving computer is addressable then the receiving computer's external IP is used to create a connection. The sending computer creates a connection to the receiving computer and sends its own connection information. The receiving computer sends its connection information. Both the sending computer and the receiving computer check each other's connection info by requesting the same information from the system registry. When the connection information is verified, an encrypted line (encrypted channel) is established using the sending computer's registry information, and data is sent to the receiving computer.

To maintain nearly always-on functionality, the system and methods of the claimed invention enable emails to be reliably sent and received from devices that may be directly addressable at one moment, but not at another. In short, the claimed invention determines the delivery route of an Internet email message or other electronic document to a receiving device that may be in a-p2p-network or out-of-p2p-network while the receiving device may or may not be directly addressable. The systems and methods of the claimed invention provide a manner of determining when the receiving computer is directly addressable and performs a method of resolving a delivery route (i.e., communications path) of a message from the sending computer to the receiving computer. Likewise, when the claimed invention determines that the receiving computer is not directly addressable, location information of the private message is delivered to a secure mail relay, so the receiving computer knows where to pick up the private message.

When the recipient is not a member of the sender's peer network, or when the recipient's receiving computer is not on-line, the secure document delivery system and method can send the private message directly between a sender and a recipient using a signaling mechanism, such as a traditional SMTP email message, for example, to notify a recipient that a message is waiting. The recipient's identity is verified with a protocol specified by the sender. The protocol can be a third party identify verification agent such as a private email registry and the like. Once the recipient is authenticated, the private email registry or other verification agent passes the location information and access instructions needed to receive the private message to the recipient.

Additionally, if the sending computer and the receiving computer happen to be members of the same peer network, additional signaling is not necessary, and the private message can be delivered directly over the encrypted line of the peer network. The direct delivery of the private message from the sending computer to the receiving computer is affected without a persistent copy of the message being stored on any intermediate devices. For example, the private message can be routed through a mail submission agent, a mail user agent, and/or a message relay server accessible to both the sending computer and the receiving computer, and none of these intermediate computers stores a copy of the message. The message persists only on the sending computer and the receiving computer.

For example, with the system and method of the claimed invention, a sending computer connects to the registry and requests connecting information for the receiving computer, which information contains receiving computer's external IP, local IP, certificate, direct addressability flag and (if not directly addressable) relay IP and relay session. If the receiving computer is on the same local network as the sending computer, a local IP will be used to create a connection. Otherwise, if the receiving computer is addressable then the receiving computer's external IP is used to create a connection. The sending computer creates a connection to the receiving computer and sends its own connection information. The receiving computer sends his connection information. Both the sending computer and the receiving computer check each other's connection info by requesting the same information from the system registry. When the connection information is verified, an encrypted line (encrypted channel) is established using the sending computer's registry information, and data is sent to the receiving computer. The mail service can then return the location of the sending computer to the receiving computer, and the receiving computer email client can access the private email.

When the receiving computer is not directly addressable, the sending computer uses a relay IP to create a connection to the receiving computer's relay, sending a request to establish a relay connection using the receiving computer's session ID. Once a connection is established, the procedure of the exchange described above is followed.

Using these techniques, resilience patterns are opened up that increase the reliability of the direct transfer because the sender is able to send private documents from dynamic locations. Because the message itself is not stored at a third party agent (only the location of the message is stored) the contents of the message remain completely private. In addition, because the identity verification protocol can be specified by the sender, the third party agent does not know the identity of the recipient. The third party agent knows only that the recipient has passed an identity test or other verification test devised by the sender. Likewise, the third party agent will never know what content passes between the sender and the recipient.

An example private document delivery system includes a sending computer configured to transmit an electronic document over a computer network, a receiving computer, and a dynamically established encrypted line to traverse the computer network from the receiving computer to the sending computer such that no third parties to the message receive a permanent copy of the message. The private document delivery system can also include a signaling mechanism configured to notify the receiving computer that the electronic document is waiting for delivery. The system can also includes a verification agent configured to verify the receiving computer's identity with a protocol specified by the sending computer and further configured to provide access instructions to the receiving computer. The receiving computer uses the access instructions to locate the sending computer via the dynamically established encrypted line and to receive the transmitted electronic document.

One example of the private document delivery system performs a method of sending a message over a computer network that includes resolving the delivery address of the receiving computer at the time of transmission of the private message. An encrypted line is established from a receiving computer to a sending computer, and the private message is transmitted from the sending computer directly to the receiving computer over the encrypted line to the delivery address resolved at the time of transmission. The network location of the sending computer and/or the receiving computer is not resolved until the time the message is transmitted. That is, the exact network location of the receiving computer and/or the sending computer is not known to the other party until the private message is transmitted. For example, when a message sender sends a message to a recipient, the message sender does not know where that recipient will be when he picks up the message. And when the recipient picks up the message, the recipient does not need to know the location of the sender when the sender transmitted the message. Additionally, the sending computer does not need to know when the receiving computer will pick up/receive the message. Likewise, the receiving computer does not need to know when the sending computer sent the message. That is, the time of transmission and/or receipt of the message may also be indeterminate. For example, a sender may wish to send a private message to a particular receiver. The sender composes the message and selects a secure method of transmission. When the sender composed the message, the sender (and the sending computer) did not know the network address of the receiving computer. However, when the sender initiates the transmission of the private message, the sending computer resolves the network address of the receiving computer, establishes an encrypted line from the receiving computer to the sending computer, and delivers the private message.

The method also includes dynamically establishing the encrypted line from the receiving computer to the sending computer whereby no third parties to the private message receive a permanent or persistent copy of the message.

In cases where the receiving computer is not on the same peer network as the sending computer, or if the sending computer determines that the receiving computer is not presently available to receive the message (for example, the receiving computer is not on-line), the method of sending the message over a computer network can also include the sending computer signaling the receiving computer to inform the receiving computer that a message is waiting for it. For example, the sending computer can signal the receiving computer that a message is waiting by notifying the receiving computer by email, instant message, short message service (SMS), and the like. Likewise, a flag can be set in the system registry to notify the receiving computer that a message is waiting to be delivered. Alternatively, the sending computer and the receiving computer can be members of a common network that tracks the location and the online status of the sending and receiving computers.

The method of sending the message over a computer network can also include the sending computer specifying a manner of authenticating the receiver to ensure the message is delivered to the correct recipient at a receiving computer. For example, the sending computer can specify a manner of authenticating the receiver that includes a single use unique identification that expires in a predetermined amount of time. The predetermined amount of time can include a fixed time period or an elapsed time or can be based upon other triggers, such as time periods related to particular events, times of day, days of week, and the like. The sending computer specifying the manner of authentication can also include specifying a password that must be communicated to the recipient. The password can be delivered to the receiving computer in a non-private message letting the receiving computer know that a message is waiting to be picked up. The delivery of the password can be performed by email, SMS, and the like (inline) and/or on a separate message from the sending computer. Additionally, the sending computer can specify a third party authentication protocol to be used to ensure the message is delivered to the correct recipient. For example, the authentication can be provided to the receiver via a phone call, a separate text message, and other out-of-band media.

The method of sending the message over a computer network can also include tracking the network location (such as an IP address, for example) of the sending computer by a presence monitoring tool running on the Internet. For example, presence monitoring can be employed to determine when and where the sending computer and/or the receiving computer were on-line or otherwise available to send and/or receive messages. Presence monitoring can be performed by tracking the IP or network address of the sending computer and/or the receiving computer. The presence monitoring tool can be a component of the sending computer and/or the receiving computer or can be a separate device that can determine the IP or network address of the sending and receiving computers.

Also, the method can include staging the message on a secure message delivery service. Further, the method of delivery of the message over a computer network can be effected by "waking up" the sending computer and/or the receiving computer using "Wake on" technology, such as Wake-on-LAN, Wake on Wireless LAN, and the like. The sending computer and the receiving computer can be on separate local networks with separate local firewalls, and delivering the message is accomplished by hole-punching in the sender's local firewall and the recipient's local network firewalls.

In order to facilitate the direct message transmission when sender and/or recipient are behind firewalls with Network Address Translation (NAT) or other filters or restrictions that prevent establishing a direct connection between the sender and recipient, the method of sending the message over a computer network can also include delivering the message via a third computer which is accessible to both the sender's computer and the recipient's computer. This third computer can act as a mail relay computer to forward the private message from the sending computer to the receiving computer without storing a persistent copy of the private message. The mail relay computer acts as an agent between the sender's peer network and the receiver's network. This can include using a mail submission agent, a mail user agent, a message relay server accessible to both the sender and the receiver, and the like. Additionally, the method can further include marshaling this computer on demand to perform the mail submission agent, mail user agent, and message relay server functions and the like. The marshaling can be performed on demand.

The method of sending the message over a computer network can also include integrating the private message transmission from the sending computer directly to the receiving computer into other non-private delivery mechanisms such as email clients, web email services, instant messaging services, and the like. As outlined below, this integration can include incorporating private message functionality through the use of new buttons or other user interface options in an existing email client, web email service, instant messaging service and the like. The integrated private messaging functions can be deployed in these existing programs using plug-in functionality or other applications for adding functionality to a host program or host user interface.

The method of sending the message over a computer network can also include the use of mobile and portable computing devices, such as where the sending computer and/or the receiving computer are laptop computers, notebook computers, tablet PCs, Internet tablets, personal digital assistants, smart phones, cellular telephones, carputers, and the like. These mobile and portable computing devices can include wireless access to a public network such as the Internet. Additionally, these devices can include synchronization features, multimedia functionality, database functionality, and other computer features.

The claimed invention dynamically routes electronic documents based on the network addressability status of the sending computer and the receiving computer and the network attachment status of the sending computer. The claimed invention determines whether the sending computer (e.g., smart phone, mobile computer, and the like) is WiFi or cellular linked to the network (e.g., Internet, etc.). The system and method of the claimed invention determines whether the sending computer is connected to the network using WiFi, which often provides a local, high bandwidth, more reliable, and directly addressable connection, or whether the sending computer is connected to the network using cellular connection protocols, which are often remote connections with lower bandwidth and can be less reliable and not directly addressable. Depending upon the type of protocol employed to connect to the network, the system and method of the claimed invention can effectively determine the most efficient manner in which to deliver a private message from the sending computer to the receiving computer.

In one example, a computer readable medium has instructions stored on it for sending messages over a computer network. A computer readable medium of the claimed invention includes computer-readable instructions stored on it to cause at least one processor to perform steps of establishing a medium for private electronic document exchanges outlined in the methods described above. For example, one computer readable storage media of the claimed invention can also include computer-readable instructions for sending a private message over a computer network where the instructions are configured to cause one or more computer processors to execute operations including resolving a delivery address of a receiving computer at the time of transmission of the private message, establishing an encrypted line from the receiving computer to a sending computer, and transmitting the private message from the sending computer directly to the receiving computer over the encrypted line to the delivery address resolved at the time of transmission.

The computer readable storage media of the claimed invention can also include computer-readable instructions configured to cause one or more computer processors to execute operations including dynamically establishing the encrypted line from the receiving computer to the sending computer whereby no third parties to the private message receive a permanent copy of the private message. Further, the time of transmitting the private message can be indeterminate.

The computer readable storage media of the claimed invention can also include computer-readable instructions configured to cause one or more computer processors to execute operations including determining when a recipient of the private message on a receiving computer is a member of a private messaging network. Further, the instructions on the computer readable storage media can cause a computer processor to signal the receiving computer, by the sending computer, that a private message is waiting. Signaling the receiving computer can include notifying the receiving computer by at least one of email, Instant message, or short message service (SMS) or can be effected by the sending computer setting a flag for the receiving computer in a system registry database to let the receiving computer know that a message is waiting for it. Further, the instructions can address the case where the sender is a member of the private messaging network and the receiving computer is a non-member of the private messaging network, and the receiving computer is notified through a non-private message to directly access the private message from the sending computer. Likewise, the instructions can address the case where the sending computer and the receiving computer are members of the same private messaging network and track their network location and online status.

The computer readable storage media of the claimed invention can also include computer-readable instructions configured to cause one or more computer processors to execute operations including specifying an authentication, by the sending computer, to ensure the private message is delivered to the correct receiving computer. For example, specifying the authentication can include the sending computer specifying a single use unique id which expires in a predetermined amount of time. Additionally, specifying the authentication can include the sending computer providing an authentication to the notified receiving computer with the non-private message indicating that a private message is waiting for the receiving computer to access. Likewise, the authentication provided to the receiving computer can include a password with which the receiving computer gains access to the waiting private message. Further, the authentication can include the sending computer providing an authentication to the receiving computer separate from the non-private message indicating that a private message is waiting for the receiving computer. When executed by at least one processor, the instructions on the computer readable medium cause a processor to execute operations including specifying, by the sender, a third party authentication protocol to be used to ensure the message is delivered to the correct receiver.

The claimed invention includes a system, device, and a method of resolving a communications path and sending a private message from a sending computer to a receiving computer over a computer network. The sending computer can be a mobile device, such as a smartphone or tablet computer and the like.

The system includes a system registry that identifies the receiving computer to which the private message is sent. The system registry determines when the receiving computer is a member of a private messaging network that includes the sending computer. For example, the system registry can identify a receiving computer user profile indicative of membership in the private message network of the sending computer. The receiving computer user profile can include an electronic mail delivery address of the receiving computer and/or an indication that private message network delivery software is installed on the receiving computer.

The system registry also determines when the receiving computer is online. The private message is stored on the sending computer when the receiving computer is not online, and the receiving computer is polled until the receiving computer is online. A network management service determines when the receiving computer is directly addressable by the sending computer, determines when the sending computer is directly addressable by the receiving computer, and the private message is released directly to the receiving computer when the receiving computer pulls the private message from the sending computer. For example, the network management service can determine when the sending computer and the receiving computer is directly addressable using a mail service component of the network management service. A delivery address of the receiving computer is resolved at the time the receiving computer is directly addressable.

The method of the claimed invention can also include sending a notification message to the receiving computer with a link to pull the private message from the sending computer when the receiving computer is not a member of the private message network that includes the sending computer. When the link is accessed, a service at the system registry is activated that dynamically locates the sending computer and connects the sending computer and the receiving computer via an encrypted channel.

Additionally, the claimed method can include marshaling a relay that provides an encrypted channel between the sending computer and the receiving computer when the sending computer is not directly addressable and releasing the private message to the receiving computer via the encrypted channel established by the relay between the sending computer and the receiving computer when the receiving computer pulls the private message from the sending computer.

In the claimed system and method of the claimed invention, the encrypted channel can include a sender-relay encrypted channel between the sending computer and the relay and a relay-receiver encrypted channel between the relay and the receiving computer, where the private message is not persisted on the relay. The encrypted channel provides no persistent copy and storage of the private message by an intermediary device or third party computer.

The system and method of the claimed invention can identify a network attachment status of the sending computer and enforce private message policies based on the identified network attachment status. For example, the enforced private message policy can include a message size policy and the like.

The system and method of the claimed invention can include a network management service that tracks the on-line status of the sending computer and/or the receiving computer. The on-line status can include an IP address and/or a direct addressability status. The network management service can poll the sending computer when the receiving computer comes back on line.

When executed by at least one processor, the instructions on the computer readable medium cause a processor to execute operations, including tracking a network location of the sending computer and/or the receiving computer at the time of transmission using a presence monitoring tool. The network location of the sending computer and/or the receiving computer can be communicated to other interested network members by the presence monitoring tool.

The instructions on the computer readable medium further cause the processor to execute operations including delivering the private message to a secure message delivery service when the receiving computer is unavailable. For example, if the receiving computer of the private message recipient is off-line or otherwise unavailable, a secure message delivery service that is on-line at all times can be employed so that delivery of the private message can be guaranteed.

When executed by at least one processor, the instructions on the computer readable medium cause a processor to execute operations including delivering the private message by waking up the sending computer using at least one of Wake-on-LAN and Wake on Wireless LAN. The sending computer and the receiving computer can be on separate networks with separate firewalls, and the message can be delivered by hole-punching in the sender's local firewall and the recipient's local network firewall.

The computer readable storage media of the claimed invention can also include computer-readable instructions configured to cause one or more computer processors to execute operations to deliver the private message by a mail submission agent, a mail user agent, and/or a message relay server accessible to both the sending computer and the receiving computer, where no persistent copy of the private message is saved on the mail submission agent, mail user agent, or message relay server. The computer readable storage media of the claimed invention can also include computer-readable instructions configured to cause one or more processors to marshal the mail submission agent, mail user agent, and/or message relay server on demand.

As outlined above, when executed by at least one processor, the instructions on the computer readable medium cause a processor to integrate the transmission of the private message from the sending computer directly to the receiving computer into a non-private delivery mechanism-including email clients, web email services, and/or instant messaging services. Of course, the computer readable storage media of the claimed invention can also include computer-readable instructions configured to cause one or more computer processors to execute these operations where the sending computer and/or the receiving computer are mobile devices connected to a public network.

In each of the examples, the sending computer and/or the receiving computers can include clients that can be run inside of a web browser or outside of a web browser, such as by a web server in a private network. In all these environments, electronic documents, electronic mail, data files, programs, information, and computing resources can be accessed by a software application and retrieved and presented. Information resources, including the sending and receiving computers, and the network(s) to which they are connected, can be traversed regardless of whether the software application is a web browser, email client, or other application. Additionally, the techniques and processes described in the examples can also be performed when clients and servers are connected to multiple networks as well.

These and other advantages, aspects, and features will become more apparent from the following detailed description when viewed in conjunction with the accompanying drawings. Non-limiting and non-exhaustive embodiments are described with reference to the following drawings. Accordingly, the drawings and descriptions below are to be regarded as illustrative in nature, and not as restrictive.

BRIEF DESCRIPTION OF THE DRAWINGS

FIG. 6 shows an example system and method for accessing confidential electronic documents using remote mail access.

FIG. 7 illustrates an example system and method highlighting the process of remotely sending private mail messages.

DETAILED DESCRIPTION

When a computer user wants to send a confidential electronic document to another computer user, transfer mechanisms and processes provide many points along the delivery route where the confidential or private document could be compromised. An intuitive system and method for delivering confidential electronic documents, such as e-mail messages, attachments, applications, and the like, that establishes a direct path from the sending computer to the receiving computer through an encrypted line provides increased security, as no third parties receive permanent copies of the documents.

The transfer can be performed dynamically so that the receiving computer need not be a member of the same peer network as the sending computer and can receive a notification with a link that establishes a direct connection to the sending computer. In this fashion, privacy is maintained as physical possession of the persisted data is held strictly with the sending computer and with the receiving computer. No copies of the electronic data are ever persisted with outside parties, so there is no need for encryption at rest, and therefore there is no need for any cumbersome exchanges of encryption keys between users.

The systems and methods of the claimed invention move electronic documents, including messages, directly from a sender to a receiver at the point in time when the receiver wants to read the message. The sender and receiver can be on different computing devices throughout the day (e.g., work pc, home pc, or cellphone, tablet computer, etc.). The device they use may have variable device addresses depending on its location and its connection state (WiFi or cellular, for example), time of day, and the like. Further, the devices may or may not be directly addressable. As outlined above, the systems and methods of the claimed invention do not use a stationary mail server for privacy reasons. Messages are routed dynamically using the sender status and receiver status, keeping real-time track of the possible states described above to establish a successful private and encrypted communications path for the message.

Figure 1:
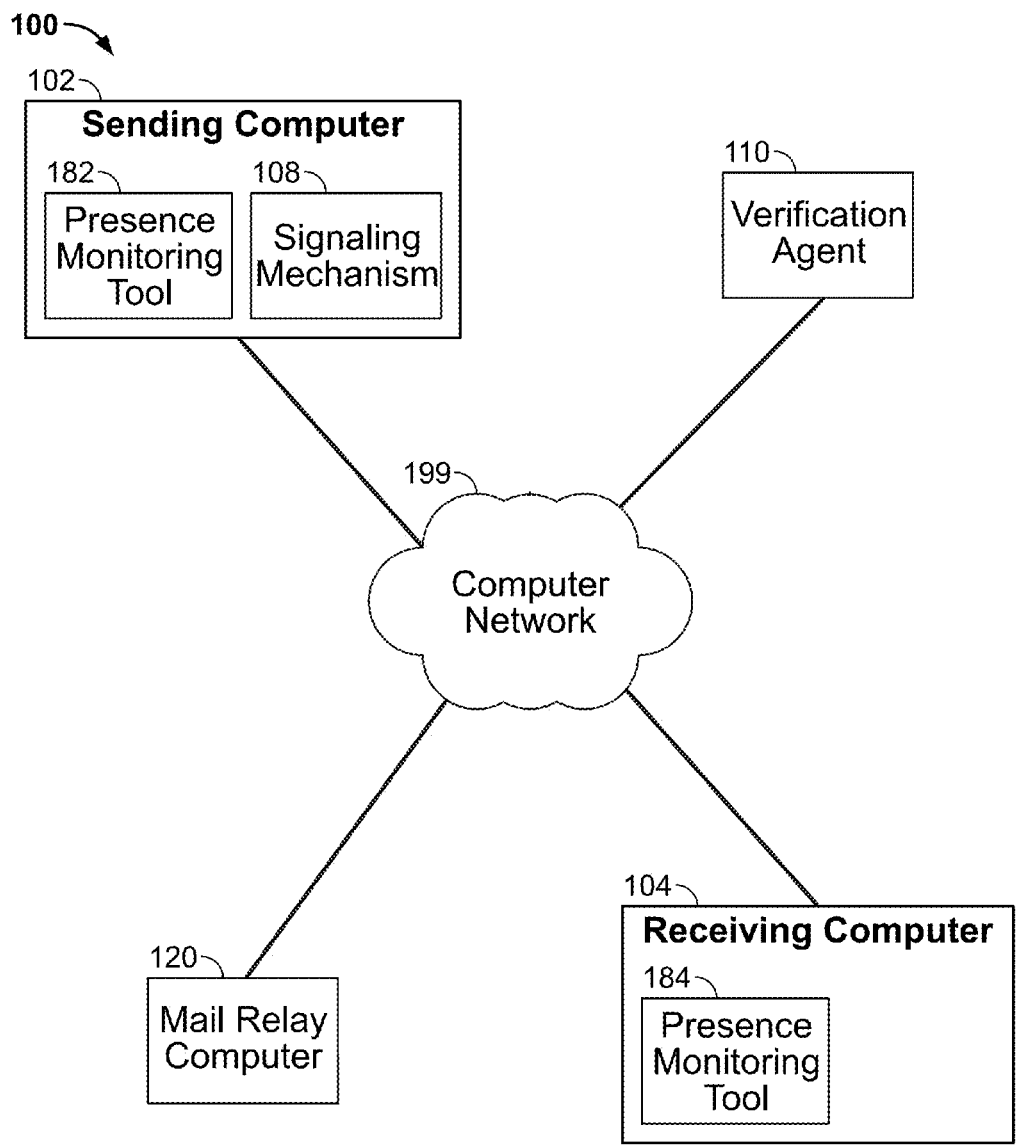
FIG. 1 is an example computer system for delivering confidential electronic files in accordance with the claimed invention.

FIG. 1 is an exemplary private document delivery system 100 that that delivers confidential documents to a user. The private document delivery system 100 delivers confidential electronic documents from a sending computer 102 to a receiving computer 104. Of course, multiple sending computers can be used in the system 100 and likewise, multiple receiving computer cans also be used in the system 100, such as when a sending computer 102 is sending a confidential electronic document to multiple receiving computers. For clarity and brevity, a single sending computer 102 and a single receiving computer 104 is shown in FIG. 1.

Generally, sending computer 102 and receiving computer 104 can include any computing device capable of connecting to another computing device to send and receive information, including web-based information. These devices can include devices that typically connect using a wired and/or a wireless communications medium, such as personal computers, desktop computers, laptop computers, notebook computers, tablet PCs, Internet tablets, personal digital assistants, smart phones, cellular telephones, carputers, mobile phones, smart phones, personal digital assistants, and the like. These mobile and portable computing devices can include wireless access to a public network, such as the Internet. Additionally, these devices can include synchronization features, multimedia functionality, database functionality, and other computer features.

In these examples, the computing devices can run web browsers that can provide an interface to make requests to different web server-based applications via the system 100. A series of web-based applications can run on the sending computer 102 and on the receiving computer 104 that facilitate the transmission of data. The sending computer 102 and the receiving computer 104 can be further configured to engage in a secure communication with other devices and/or each other using mechanisms such as Secure Sockets Layer (SSL), Internet Protocol Security (IPSec), Tunnel Layer Security (TLS), and the like.

Figure 3:
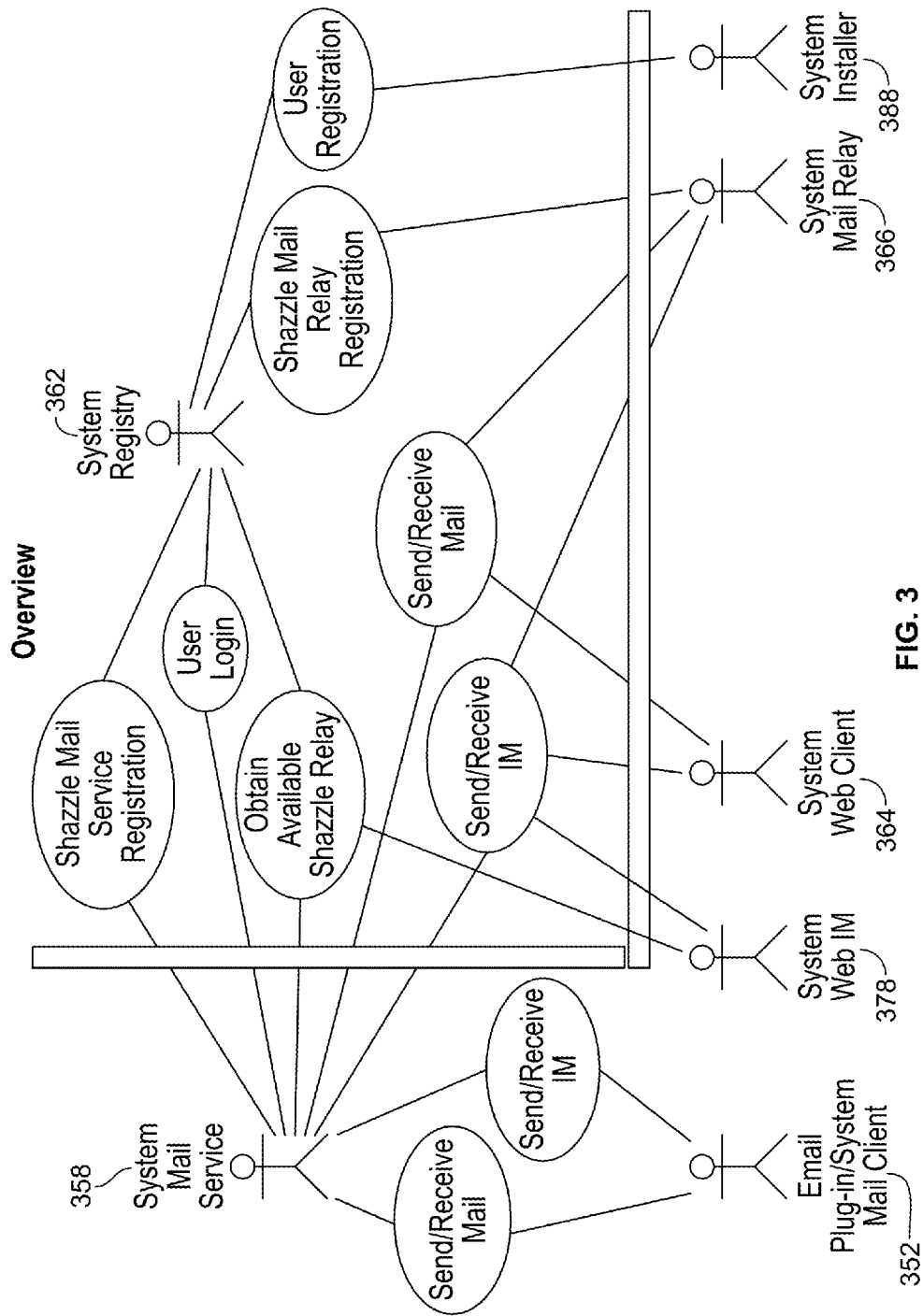
FIG. 3 illustrates relationships between example users of the system for delivering confidential electronic files.

As further shown in FIG. 3, the computing devices can be separate physical devices or integrated components in a single computing device. For example, system installer 388 provides user registration functionality when a user enrolls or is enrolled in the system registry 362. Upon registration, the enrolled members become a part of a peer network of users.

System registry 362 manages the system mail users and system relays, including system mail relay 366. System mail relay 366 includes a service installed on a user computer (such as mail relay computer 120 in FIG. 1) and provides collective communications for end applications. The service can include a set of related application and software functionalities together with policies that control usage of the service. System mail relay 366 also can provide a personal web user interface for a user attempting to access mail from a remote location. System mail relay 366 is also registered through system registry 362.

Similarly, system web client 364 is a mail and IM web client that provides a web interface for users away from their registered computers. System web client 364 provides email and IM sending and receiving functionality via system registry 362. Likewise, system web IM Interface 378 provides an IM interface for users on computing devices that do not have or cannot have the system client installed. System web IM interface 378 can send and receiving instant messages in conjunction with system mail service 358.

System mail service 358 is a user side service and interacts with the system registry 362 and system mail relay 366. System mail service 358 interacts with the system registry 362 and provides system mail service registration functionality and user login capabilities in addition to providing communication for the email plug-in 352 and other mail clients, such as Microsoft Outlook, Pegasus Mail, Mozilla Thunderbird, Apple Mail, JavaMail, GNU JavaMail, and the like. Additionally, email plug-in 352 provides a user interface to send and receive electronic documents such as emails, instant messages, and the like.

Figure 2A:
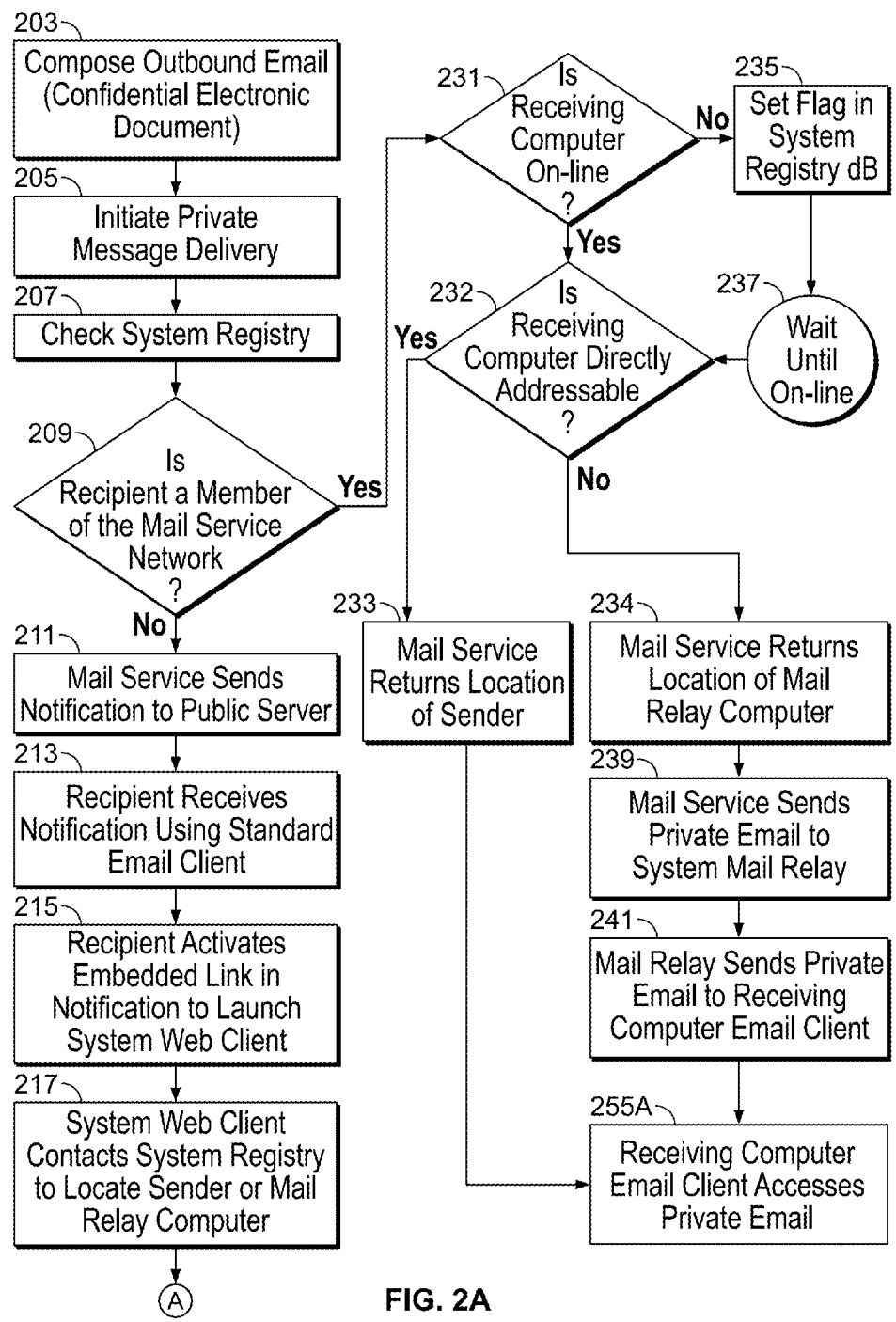
FIGS. 2A-2B is a flow chart showing a process for delivering confidential electronic files using a computer system of FIG. 1.
Figure 2B:
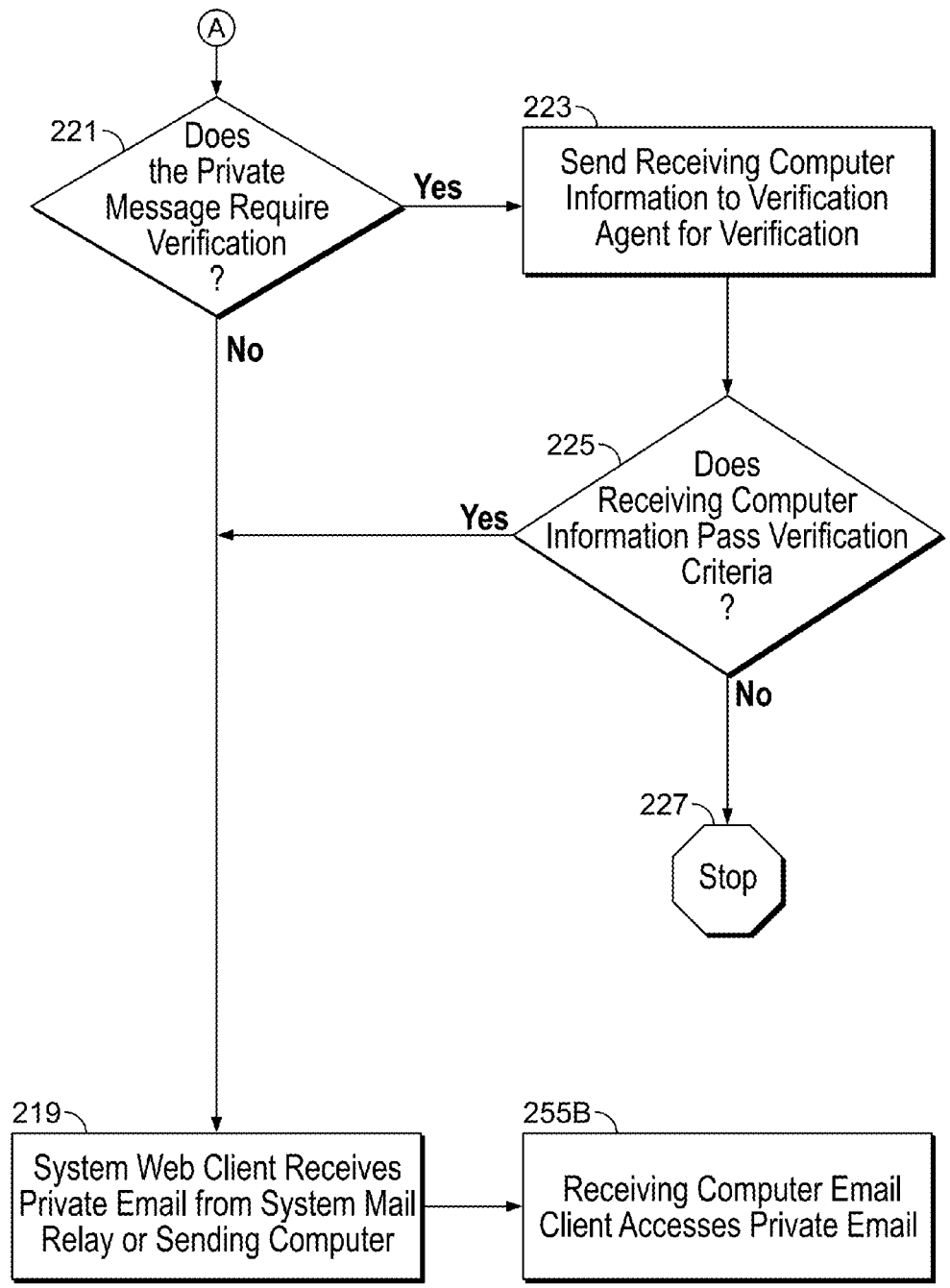
Figure 4A:
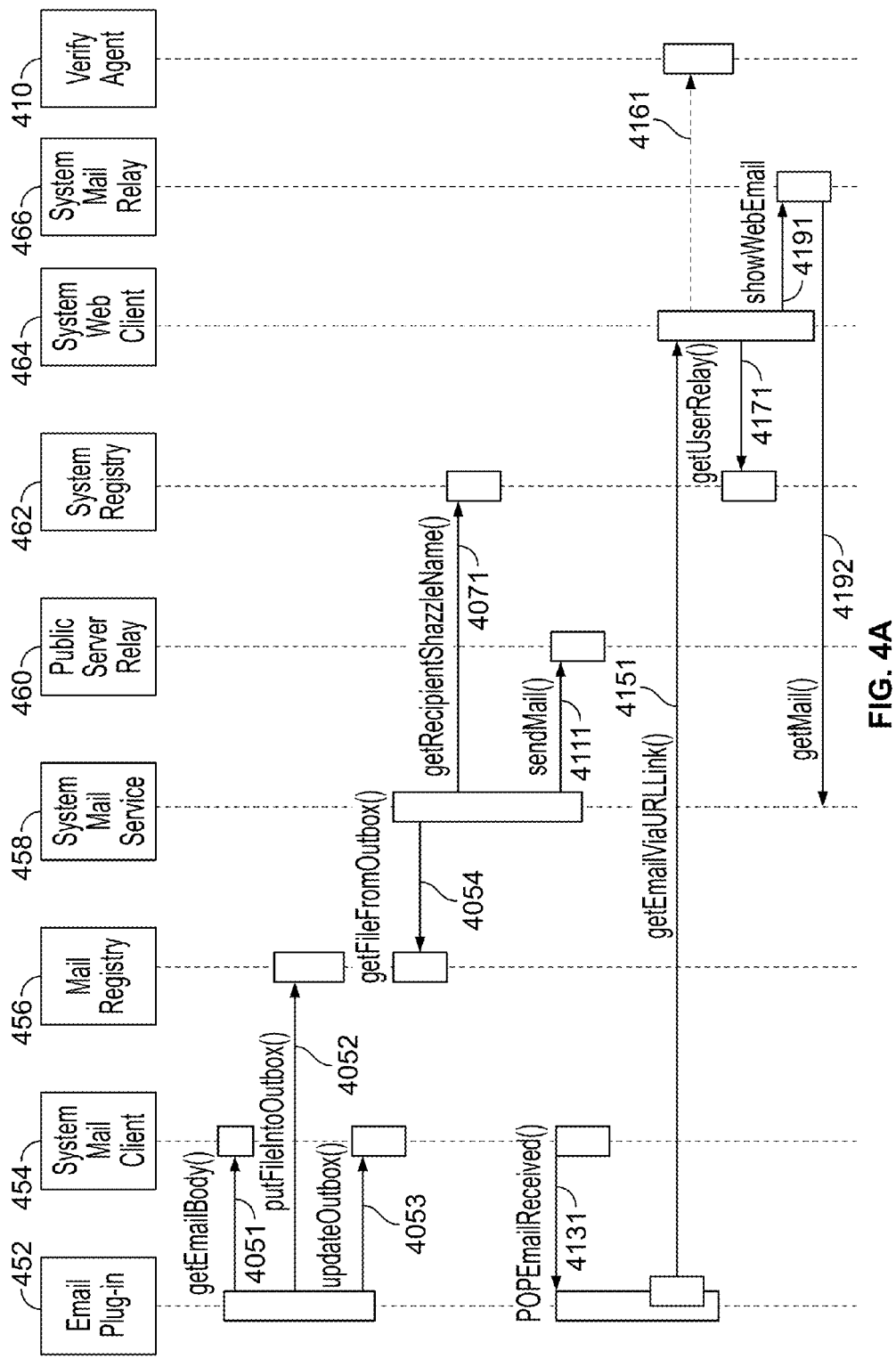
FIG. 4A shows an example system for delivering confidential electronic files to a receiving computer that is outside the network of the sending computer.
Figure 4B:
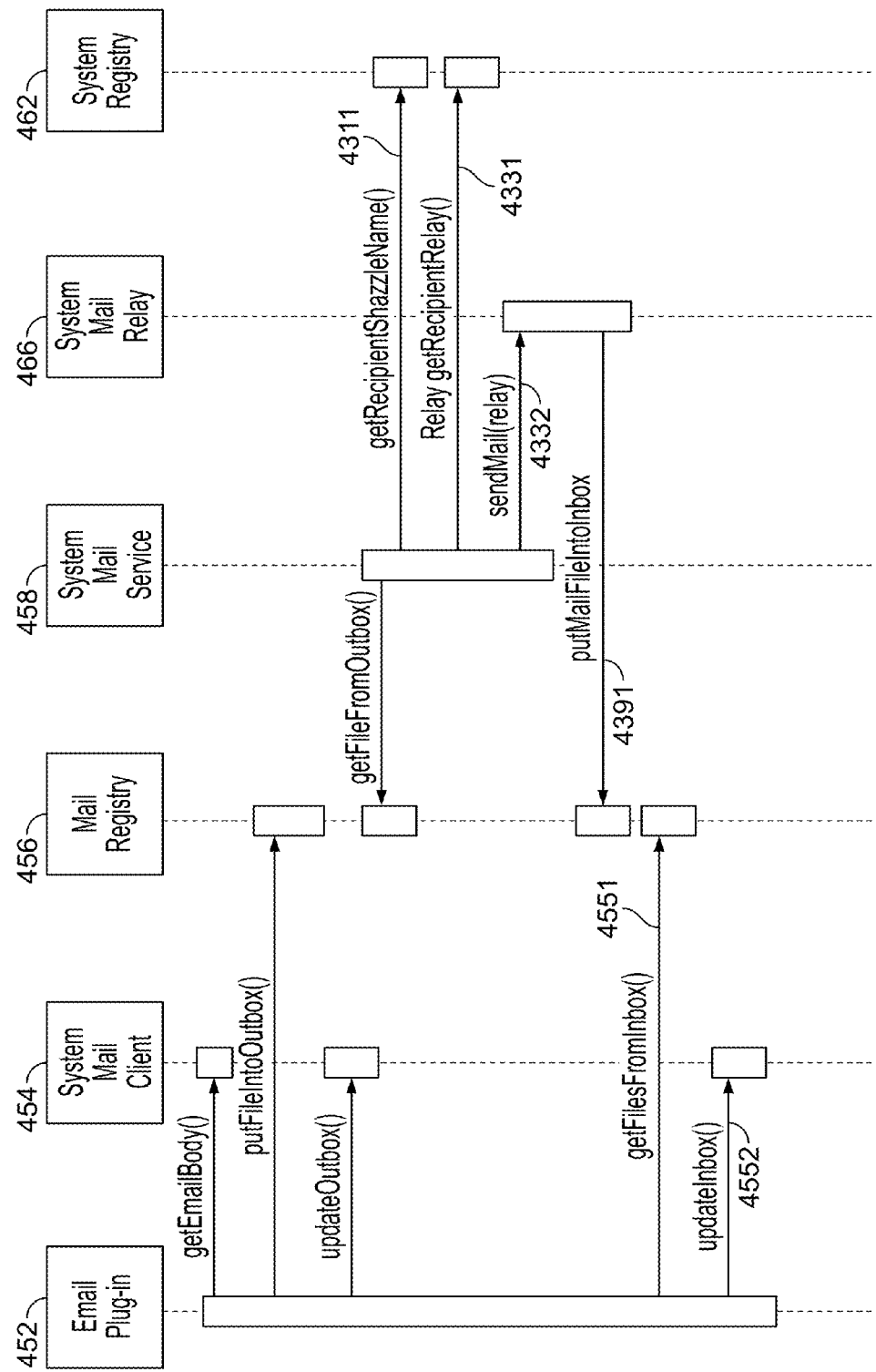
FIG. 4B shows an example system and method for delivering confidential electronic files to a registered receiving computer.

Referring to FIGS. 1, 2A, and 2B, a user of a sending computer 102 composes a confidential electronic document for delivery to a receiving computer 104 in block 203 shown in FIG. 2A. Additionally, FIGS. 4A and 4B further illustrate respective devices used to effect the confidential electronic document delivery. FIGS. 4A and 4B can be used in conjunction with the flow chart of FIG. 2 to further understand the method and system of delivering confidential electronic documents in accordance with the claimed invention.

For example, in FIG. 4A, the user of an email client uses email plug-in 452 of the claimed invention on sending computer 102 to compose an outbound email message. In block 205 of FIG. 2A, the user indicates to sending computer 102 that a selected electronic document is to be delivered confidentially using the private message delivery methods of the claimed invention. As further shown in FIG. 4, this initiation can include selecting a "Send Secure" option in block 4051 to initiate the confidential delivery of the electronic document where the email plug-in 452 acts upon the body of the email message. In block 4052, the email message is put into the outbox of the system mail client 454, and in block 4053, the outbox is updated. Once the outbox is updated, in block 4054 the system mail service 458, running on the user's sending computer 102, retrieves the secure email from the mail registry 456. Mail registry 456 can be a mailbox, inbox, outbox or other directory, folder, or storage location where email is stored before and/or after being sent.

The email plug-in 452 functionality can be added to the underlying email system of the user's sending computer 102 by installing computer readable instructions on a computer readable media (not shown separately) of the sending computer 102. As in the example above, the computer readable instructions can include plug-in functionality to add a "Send Secure" button to an email user interface screen on the sending computer 102 as well as the other functions and methods of the claimed invention. Of course, other techniques for adding this functionality can also be used.

Returning to FIG. 2A, once the private message delivery is initiated and the secure email is retrieved from the outbound mail registry, in block 207 the system mail service 458 checks the system registry 462 to determine if the message recipient on the receiving computer 104 is registered as a system member. That is, the system checks to determine if both the sending computer 102 and the receiving computer 104 are members of the same peer network. When the sending computer 102 and the receiving computer 104 are members of the same private messaging network, they can track their network location and online status. For example, sending computer 102 and receiving computer 104 can track the network location and on-line status of the sending computer 102 and/or the receiving computer 104 at the time of transmission by using a presence monitoring tool, such as presence monitoring tools 182 and 184 as shown in FIG. 1. The system check process to determine if both the sending computer 102 and the receiving computer 104 are members of the same peer network is also shown schematically in FIG. 4A as reference numeral 4071. If the system 100 determines in block 209 that the receiving computer 104 is registered as a member of the private message delivery system, the process continues to block 231 in FIG. 2A as described below.

If, however, the system 100 determines in block 209 that the receiving computer 104 is not a registered member of the private message delivery system, the process continues to block 211. In block 211, the system mail service 458 sends a notification to a public server. For example, as shown further in FIG. 4A, the system mail service 458 sends an email notification in block 4111 to a public server relay 460, such as a standard POP server relay, an SMPT relay, or another remote server using a TCP/IP connection.

Once the notification is sent to a public server relay 460, in block 4131 (block 213 in FIG. 2A) the receiving computer 104 receives a notification email using a standard email client from a standard, non-private email network. The notification email includes an embedded link in the email message.

The recipient on the receiving computer 104 activates the embedded link in the email message in block 215 of FIG. 2A. As further shown in FIG. 4A, activating the link in the notification email launches the system web client 464 in block 4151 that enables a user to traverse information resources on the computer network 199. As also shown in block 217 of FIG. 2A, the system web client 464 contacts the system registry 462 to locate the sending computer 102 that has the private email. For example, in FIG. 4A, the system web client 464 contacts the system registry 462 in block 4171 by sending a getUserRelay( ) process to locate the sending computer 102 that contains the private email.

Alternatively, when the system web client 464 contacts the system registry 462, the system registry 462 could provide an indication that the private message requires verification as shown in block 217A in FIG. 2B. For example, when a direct connection between the would-be receiving computer and the sending computer cannot be established, verification of the private message can be required.

In this instance, in order to send the message directly between a sending computer 102 and a receiving computer 104, a signaling mechanism, such as signaling mechanism 108 is used to notify the recipient that a message is waiting for him. A third party agent, such as verification agent 110 is used to verify the recipient's identity with an authentication protocol specified by the sender. If it is determined above that verification is required in block 221, the process continues to block 223 where receiving computer information is sent to the verification agent for authentication/verification. This process is shown further in FIG. 4A in block 4161 where the system web client 464 queries verification agent 410. As outlined above, verification criteria could include a host of receiving computer information, including a password identification, a user ID, a certificate, and the like.

In block 225, the system determines if the receiving computer information passes the verification criteria. If the receiving computer information does not pass the verification criteria, the process stops in block 227. If, however, the receiving computer information passes the verification criteria, the process continues to block 219. Likewise, if the system determined in block 221 that verification of the private message was not required (for example, if a direct connection between the would-be receiving computer and the sending computer can be established), the process proceeds directly to block 219.

Once authenticated, in block 219, the verification agent 110 confirms that location information and access instructions are available (at block 217) for the receiving computer 104 to receive the private message. After the verification agent 110 verifies the authenticity of the recipient, it provides access instructions that allow the recipient to locate a dynamic sender. This provides additional resilience patterns to increase reliability of the direct transfer because the sender is able to send from dynamic locations. Because the message itself is not stored at the verification agent 110 (only the location of the message) the contents of the message remain completely private. In addition, because the identify verification protocol may be specified by the sender, the third party verification agent 110 does not know who the recipient is—only that the recipient has passed an identity test devised by the sender. Also, the third party verification agent 110 will never know what content passes between sender and receiver.

In block 219 of FIG. 2B, the system web client receives the private email from the sending computer 102 or the system mail relay 466, and the email client of the receiving computer 104 access the private email in block 255B. For example, in FIG. 4A, the system web client 464 sends a showWebEmail( ) process to system mail relay 466 in block 4191 receives the private email from the system mail relay 466 by executing a getMail( ) process in block 4192, and the email client of the receiving computer 104 accesses the private email. When the receiving computer 104 receives the private email message, the message can be stored in a destination email box to be subsequently viewed using an email client, email reader, mail user agent, and the like.

Returning to block 209 of FIG. 2A, if the system determines that the receiving computer 104 of the recipient is also a member of the mail service peer network (along with the sending computer), the process continues to block 231. The process of sending and receiving email with both the sending computer and the receiving computer registered with the system registry is further illustrated in FIG. 4B. In block 231, the system determines if the receiving computer 104 is on-line and connected to the peer network. For example, as shown in block 4311 of FIG. 4B, the system mail service 458 sends a getRecipientShazzleName( ) process to the system registry 462. If the receiving computer 104 is on-line, the process continues to block 232. If the receiving computer 104 is not on-line, in block 235 a flag is set in a database of the system registry 462. In this instance, the system will wait to deliver the confidential electronic document until the receiving computer 104 is back on-line as shown in block 237 before proceeding to block 232. Conventional store and forward telecommunications techniques store the electronic communication at an intermediate station, such as an email server or the like, and send the communication to the receiving computer at a later time. In the systems of the claimed invention, a high degree of privacy is achieved by maintaining physical possession of the electronic communication strictly with the sender and the receiver. No copies of the e-mail message or attachment(s) are persisted with outside parties, including intermediate stations. As such, there is no opportunity to intercept the confidential electronic communication by breaching the intermediate station.

When the receiving computer 104 is back on-line, or in block 231 when the system determined that the receiving computer 104 is on line, the process continues to block 232 where the system determines if the receiving computer is directly addressable. If the receiving computer is directly addressable, such as where a direct connection between the receiving computer 104 and the sending computer 102 can be established, the process continues to block 233 where the mail service 458 returns the location of the sending computer 102 so that the direct connection is established. On the other hand, if the system determines in block 232 that the receiving computer is not directly addressable, the process continues to block 234 where the mail service 458 returns a location of a system mail relay 466. For example, as shown in block 4331 of FIG. 4B, the system mail service 458 sends a getRecipientRelay( ) process to the system registry 462.

Referring again to FIG. 2A, in block 239 the mail service 458 sends a private email to mail relay 466. The mail service 458 can create an SSL channel via mail relay 466. For example, as further shown in block 4332 in FIG. 4B, the mail service 458 sends a sendMail(relay) process to mail relay 466 to effect transmission of the private email.

The sending computer 102 can then verify a certificate of the receiving computer 104 or the mail relay 466 can send a private email to the system mail client 454 of receiving computer 104 as shown in block 241 of FIG. 2A. The receiving computer 104 can also verify the sending computer 102 by requesting a certificate of the sending computer 102. The system mail client 454 of receiving computer 104 can then access the private email as shown in block 255A. Likewise, as further shown in block 4391 in FIG. 4B, the sending computer 102 can transmit the message to the receiving computer 104 via the mail relay 466 where the mail file is put into the mail registry 456 of the system mail client 454 of the receiving computer 104, and a user can access the private email message from the mail registry 456 such as in block 4551 when the email program plug-in executes process getFilesFromInbox( ). The inbox is then updated in block 4552 as shown in FIG. 4B.

Figure 9:
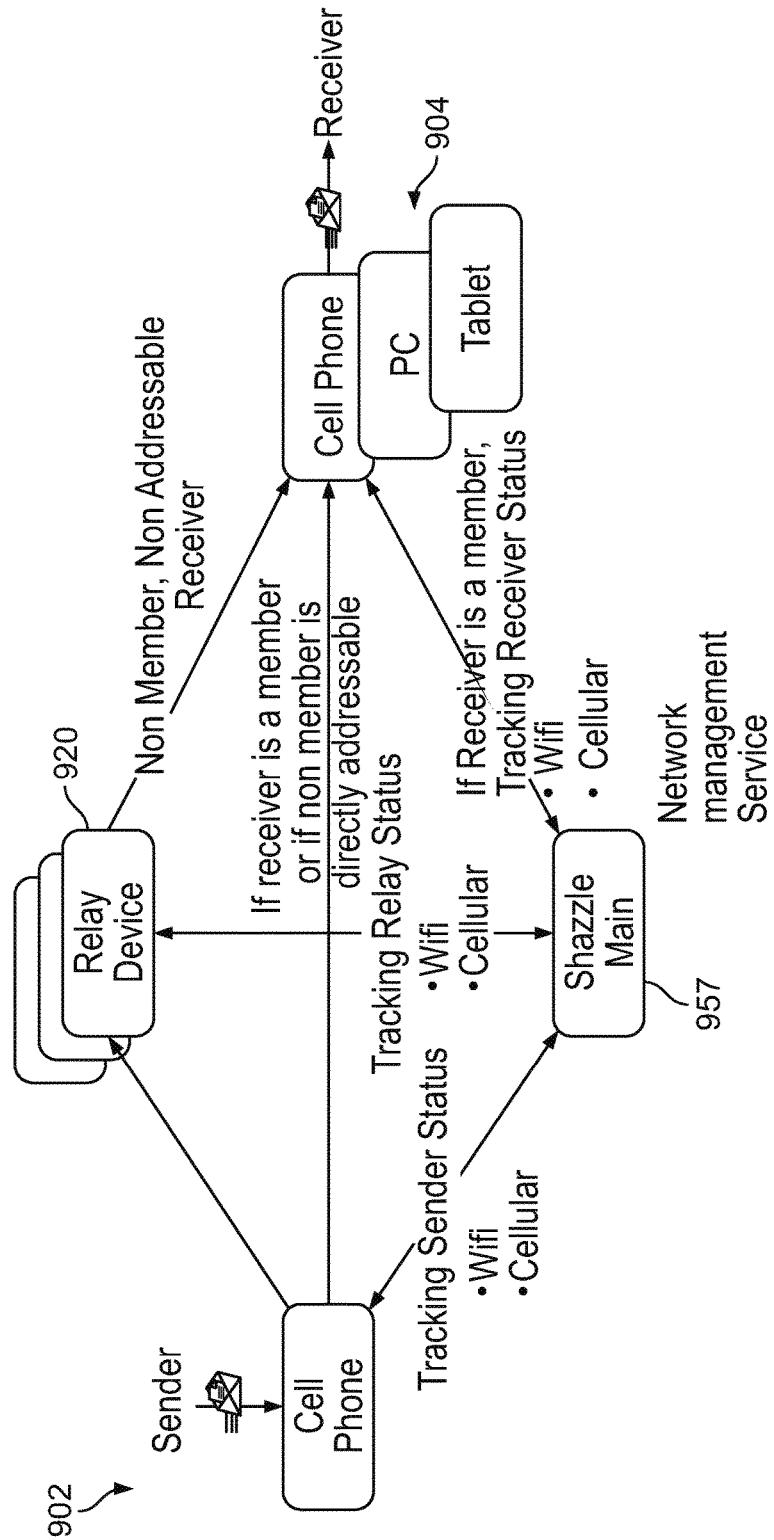
FIG. 9 shows an example smart message routing system in accordance with the claimed invention.

As shown further in FIG. 9, when either the sending computer 902 or the receiving computer 904 is not directly addressable on the computer network (for example, the Internet) because the party is behind a firewall using Network Address Translation (NAT), on a mobile device, or accessing the Internet via a proxy server, then both parties (sending computer 902 and receiving computer 904) can be assigned a relay device 920. In one example embodiment, the sending computer 902 is cell phone (smart phone), which can be connected to the Internet by either a Wi-Fi connection or by a cellular connection. Message routing can be optimized based on the type of network connection, the message characteristics, the capacity of the sending computer, receiving computer, and relay device and based on privacy requirements.

Figure 10A:
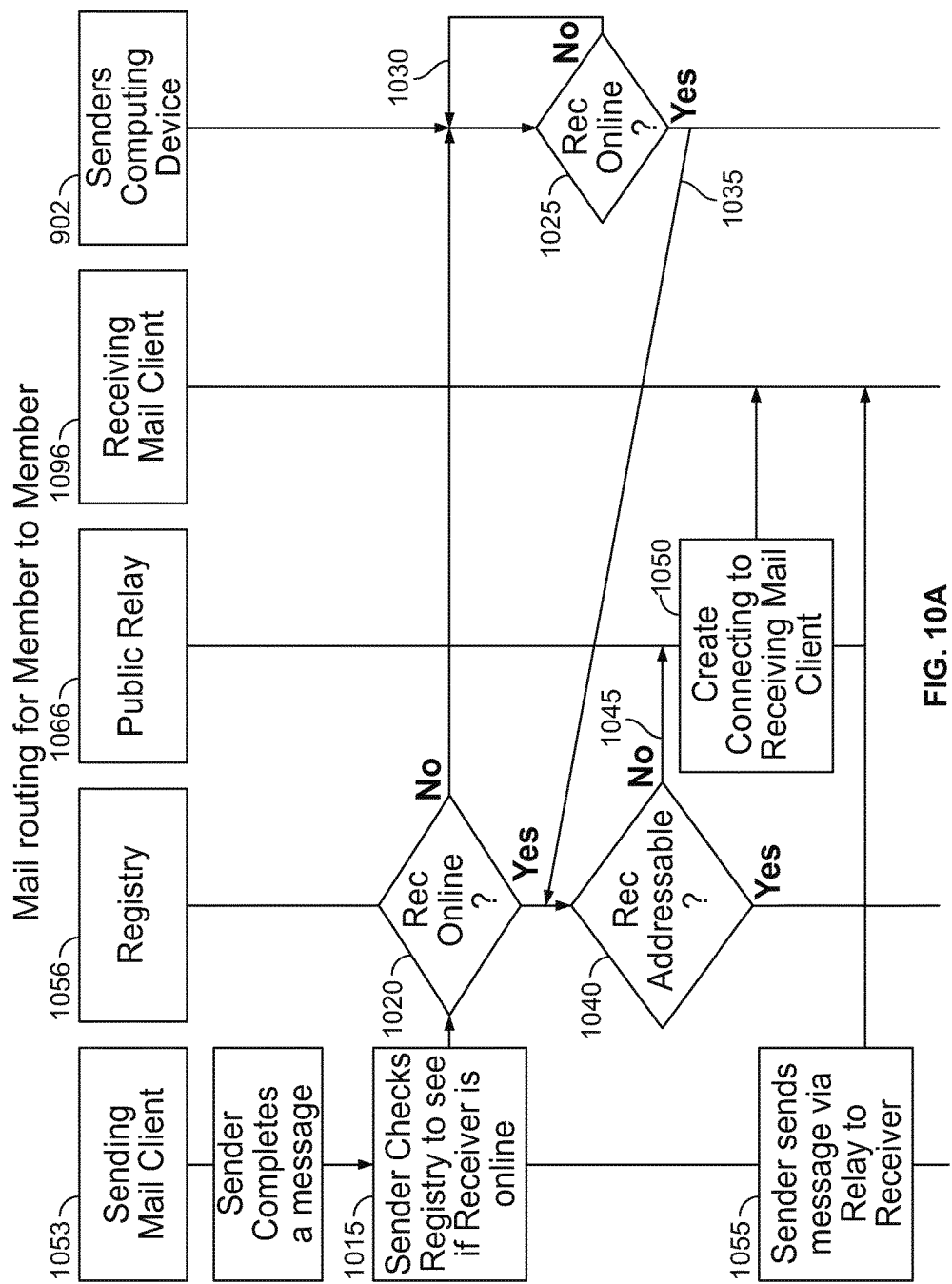
FIG. 10A shows an example system and method for delivering confidential electronic files when the sending computer and the receiving computer are both members of the same private message network.
Figure 10B:
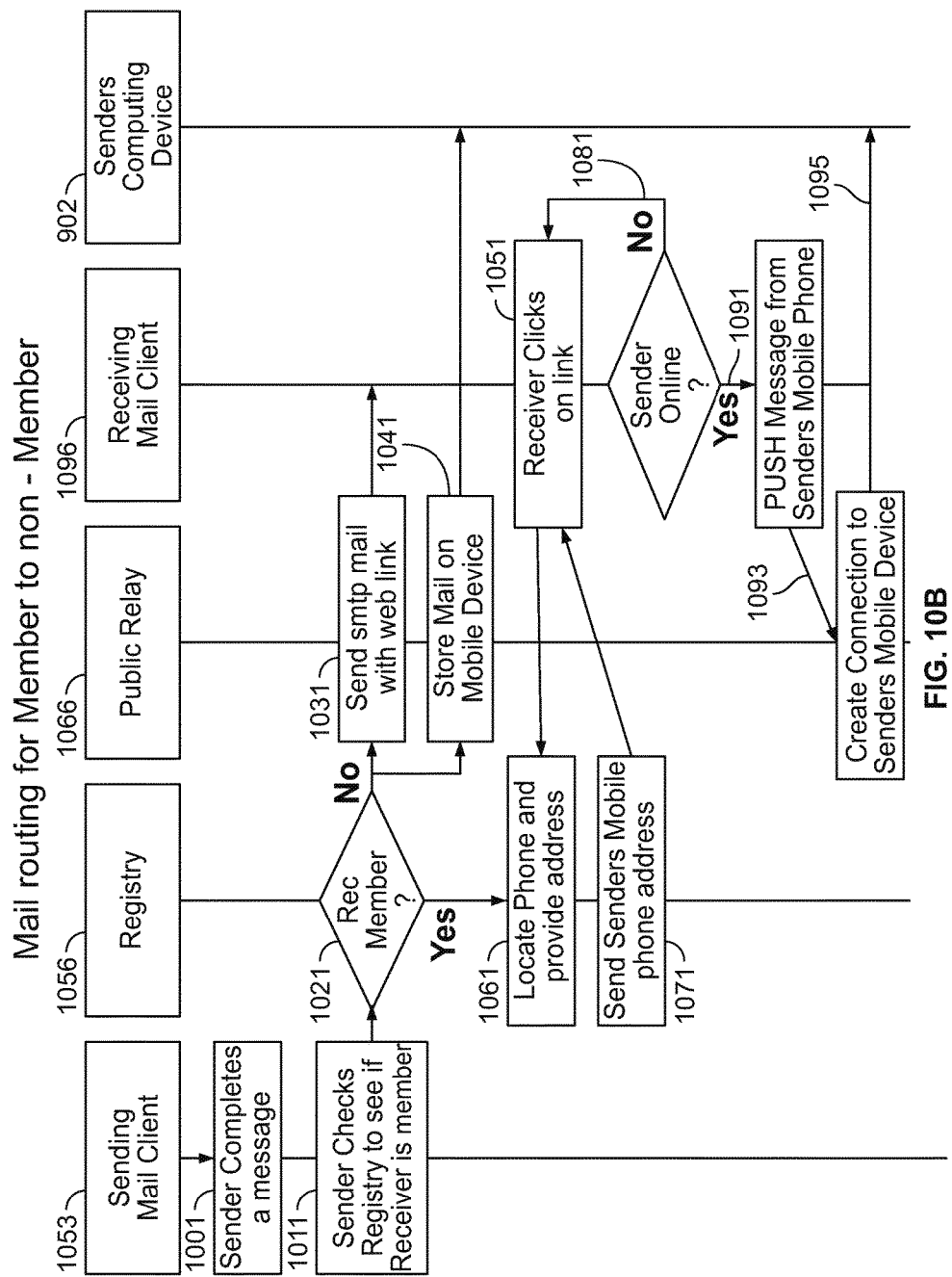
FIG. 10B shows an example system and method for delivering confidential electronic files using a relay when the receiving computer is not a member of the sender's private message network.

FIGS. 10A and 10B show, respectively, instances where the sending computer 902 and receiving computer 904 are members of the same private message network, and where the receiving computer 904 is not a member of the sender's private message network. Membership in the private message network can include users signing up for the service or otherwise enrolling based upon their affiliation with a particular organization. The private message network can include mailbox providers, mail service providers and/or email service providers as part of a department or organization that provides email hosting.

As also shown in the example system and method depicted in FIGS. 9 and 10B, when the party at the receiving computer 904 wishes to read the private message and sending computer 902 and receiving computer 904 cannot directly connect (such as when one party is on a mobile device, or using an NAT, for example), the network management service 957 tracks the status of the sending computer 902 and eligible relays (and the receiving computer 904 if the receiving computer 904 is a member of the network). The network management service 957 provides system mail service and mail registry as outlined above.

Both receiving computer 904 and sending computer 902 connect to a relay 920 that facilitates a point to point encrypted connection between the sending computer 902 and the receiving computer 904 so the receiving computer 904 can retrieve the message.

This routing decision is made at run time based on a variety of factors as described above (e.g., network addressability of sending computer, network addressability of the receiving computer, the connectivity of the sending computer and the size of the message, and the like). This routing decision is made differently from conventional mail architectures where the route is pre-established based on the mail exchange record in the domain name system (MX DNS records) for the sending computer and receiving computer. Rather than specifying a mail server that is responsible for accepting email messages on behalf of the receiving computer and using a preference value to prioritize mail delivery if multiple servers are available, the characteristics of the sending computer, receiving computer, relays, and message are used to identify eligible relays, and a relay is selected based on those characteristics. The systems and methods of the claimed invention provides privacy not only when using static devices (e.g., sending computer, receiving computer, and the like) in a sender and a receiver's physical possession, but a much wider range of devices that can include non-static devices, which may or may not be directly addressable.

Additionally, when a private message is sent between at least one mobile device (that is, the sending computer and/or the receiving computer is a mobile device that may not be in the same physical location when the message is sent and/or received, the process shown in FIG. 10B can also be performed.

For example, as shown in FIGS. 9 and 10B, in block 1001, the sending email client 1053 uses an email plug-in (not shown separately) of the claimed invention on sending computer 902 to compose an outbound email message. In block 1011, the sending email client 1053 checks the system registry 1056 to see if the receiving computer 904 is a member of the private message network of the sending computer 902. If the determination is made in block 1021 that the receiving computer 904 is not a member of the sending computer's private message network, the process continues, and in block 1031, an SMTP mail with web link is sent to the receiving mail client 1096 on the receiving computer 904, and the private message is stored on the sending computer 902 (e.g., a smartphone or other mobile device, for example) in block 1041. If, on the other hand, the system determines that the receiving computer 904 is a member of the sending computer's private message network, the process continues in block 1015 of FIG. 10A.

Once the receiving computer 904 is notified that there is a private message awaiting their retrieval, the user of the receiving computer 904 (not shown in FIG. 10A) uses the receiving mail client 1096 (residing on the receiving computer 904) in block 1051 and clicks on the link that was delivered to the receiving mail client in block 1031 above. In block 1061, the receiving mail client 1096 accesses the registry 1056 to locate the sending computer 902 (phone or other mobile computing device). The registry 1056 sends the mobile phone address of the sending computer 902 to the receiving mail 1096 client in block 1071. The receiving mail client 1096 determines if the sending computer/mobile computing device 902 is on line in block 1081. If the sending computer/mobile computing device 902 is not on-line, the receiving mail client 1096 can later contact the registry 1056 to locate the phone 902 (in block 1061) and receive the sender's address (in block 1071). If the receiving mail client 1096 determines that the sending computer/mobile computing device 902 is on-line, the process continues in block 1091 and the receiving mail client 1096 pulls the message from the sender's mobile phone 902 via public relay 1066. The receiving mail client 1096 then creates a connection to the sender's mobile device 902 in block 1093, and the receiving computer 904 receives the message via the public relay 1066.

As outlined above, if the system determines that the receiving computer 904 (not shown in FIG. 10A) is a member of the sending computer's private message network, the process continues in block 1015 of FIG. 10A where the sending mail client 1053 checks system registry 1056 to determine if the receiving computer 904 is on-line. In block 1020, if the system determines that the receiving computer 904 is not on line, the system will continue to check in blocks 1025 and 1030 until the receiving computer 904 is on-line and then will follow block 1035. When the system determines that the receiving computer 904 is on line in either block 1020 or in block 1035, the registry 1056 will determine if the receiving computer 904 is addressable in block 1040. If the receiving computer 904 is addressable in block 1040, the sending computer mail client 1053 will send the private message directly to the receiving mail client 1096 on the receiving computer 904. If, however, the receiving computer 904 is found to be not addressable in block 1040, then in block 1050, the public relay 1066 will create a connection to the receiving mail client 1096 of the receiving computer device 904, and in block 1055, the sender will send the private message via relay 1066 to the receiving mail client 1096.

Figure 11:
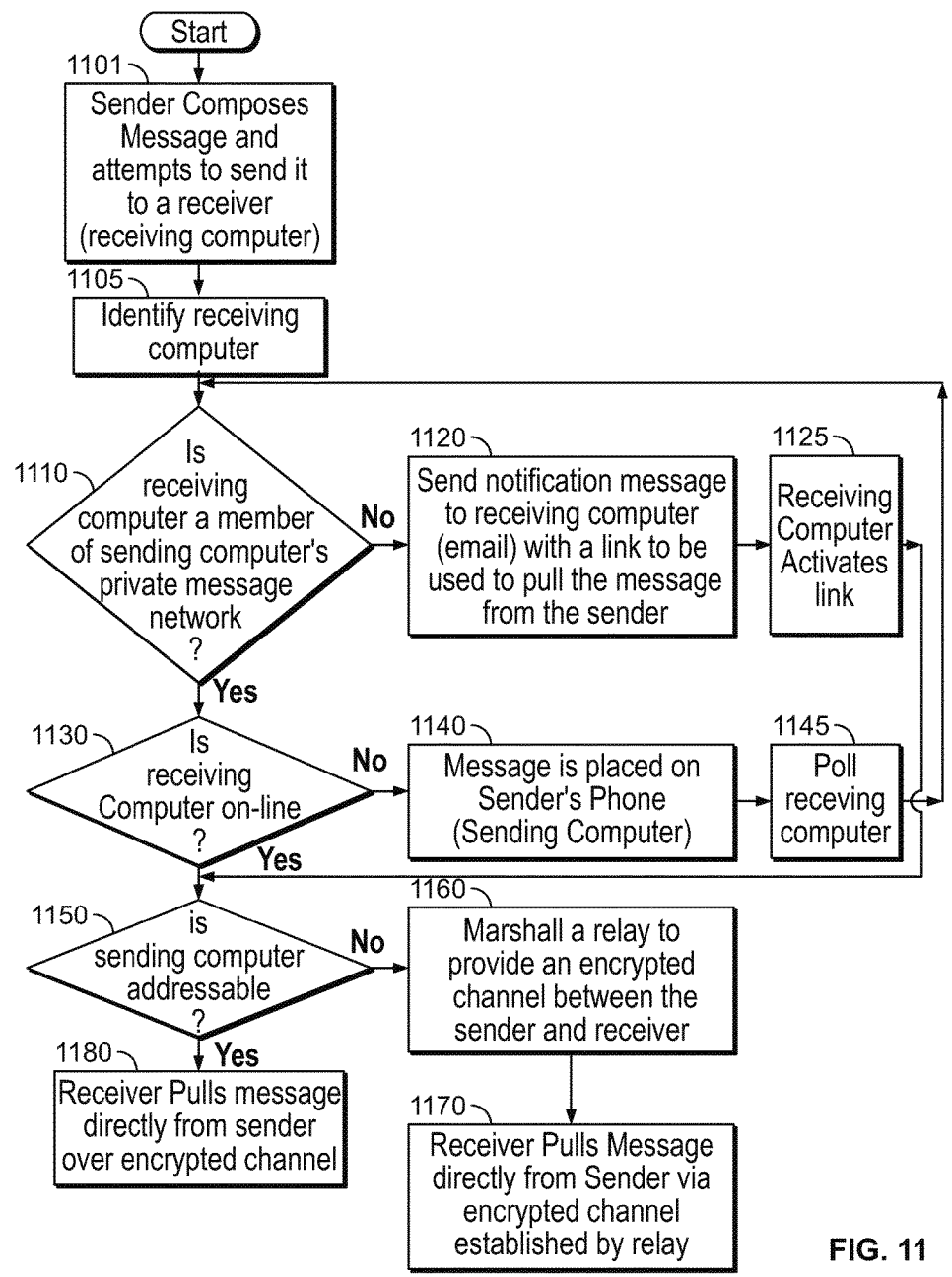
FIG. 11 shows an example flow diagram showing a process for delivering private messages in accordance with the claimed invention based on the network addressability status of the sending computer and the receiving computer and the network attachment status of the sending computer.

FIG. 11 shows a process flow diagram when a private message is sent from a sending computer 902 to a receiving computer 904. The process starts in block 1101 where a sender composes a private message and attempts to send the private message to the receiving computer 904 using sending computer 902. In block 1105, the system registry 1056 identifies the receiving computer 904. The sending computer 902 can be a mobile computing device such as a smartphone, tablet computer, and the like.

In block 1110, the system registry 1056 determines if the receiving computer 904 is a member of the sending computer's private message network. For example, the system registry 1056 can identify a receiving computer user profile indicative of membership in the private message network of the sending computer 902. The receiving computer user profile can include an electronic mail delivery address of the receiving computer 904 and/or an indication that private message network delivery software is installed on the receiving computer 904.

When the receiving computer 904 is not a member of the sending computer's private message network in block 1110, the process moves to block 1120 where a notification message is sent to the receiving computer 904 with a link to be used to pull the message from the sending computer 902. The notification message can be an electronic mail message or the like. When the receiving computer 904 receives the notification message, the receiving computer 904 activates the link in block 1125, which activates a service at the system registry dynamically locates the sending computer in preparation of connecting the sending computer and receiving computer via an encrypted channel (see block 1180 below), and the process continues to block 1150 below.

When the receiving computer 904 is a member of the sending computer's private message network in block 1110, the process continues to block 1130 where the system registry 1056 determines if the receiving computer 904 is online. The network management service 957, including system registry 1056 can track the online status of the sending computer 902 and/or the receiving computer 904 as well as other computers in the network of the sending computer 902. The online status can include an IP address, a direct addressability status, and the like. If the receiving computer 904 is not online, the private message is stored on the sending computer 902 in block 1140, and the receiving computer 904 is periodically polled in block 1145 to determine when the receiving computer 904 comes back online, and the process returns to block 1110.

When the receiving computer 904 is online in block 1130, a delivery address of the receiving computer is resolved, and the sending computer is polled to ensure it is also online, and the process continues to block 1150 where the network management service 957 determines if the sending computer 902 is directly addressable. The network management service 957 can determine when the sending compute r902 is directly addressable using a mail service component (not shown separately) of the network management service. If the sending computer 902 is directly addressable, the receiver pulls the message directly from the sending computer 902 over an encrypted channel between the sending computer 902 and the receiving computer 904 in block 1180.

If however, the sending computer 902 is not directly addressable in block 1150, the process continues to block 1160 where a relay 920 is marshaled to provide an encrypted channel between the sending computer 902 and the receiving computer 904. The encrypted channel can include a sender-relay encrypted channel between the sending computer 902 and the relay 920 and a relay-receiver encrypted channel between the relay 920 and the receiving computer 904. The private message is not persisted on the relay 920 or on any intermediary device or third party computer.

The system and method of the claimed invention can also identify a network attachment status of the sending computer and enforce private message policies based on the identified network attachment status. For example, the sending computer can be connected by a WiFi or cellular link to the network, and private message policies can be enforced based on whether the sending computer is attached to the network on a WiFi or cellular basis. As outlined above, the sending computer connected to the network using WiFi often realizes performance benefits of a local, high bandwidth, more reliable, and directly addressable connection. When a sending computer is connected to the network using cellular connection protocols, the performance may be dictated by lower bandwidth, less reliability, and no direct addressability. Private message policies can be enacted depending upon the type of protocol employed to connect to the network. For example, the size of the private message can be limited when using a less-efficient network attachment type.

As above, in order to send the message directly between a sending computer 102 and a receiving computer 104, signaling mechanism 108 can be used to notify the recipient that a message is waiting for him. The verification agent 110 is used to verify the recipient's identity with a protocol specified by the sender, and the verification agent 110 passes the location information and access instructions needed to receive the private message to the receiving computer 104. In this case, the location information and access instructions are coming from the mail relay 120 rather than the sending computer. This provides additional resilience patterns to increase reliability of the direct transfer because the sender is able to send from dynamic locations. Because the message itself is not stored at the verification agent 110 or the mail relay 120 (only the location of the message) the contents of the message remain completely private.

Figure 5:
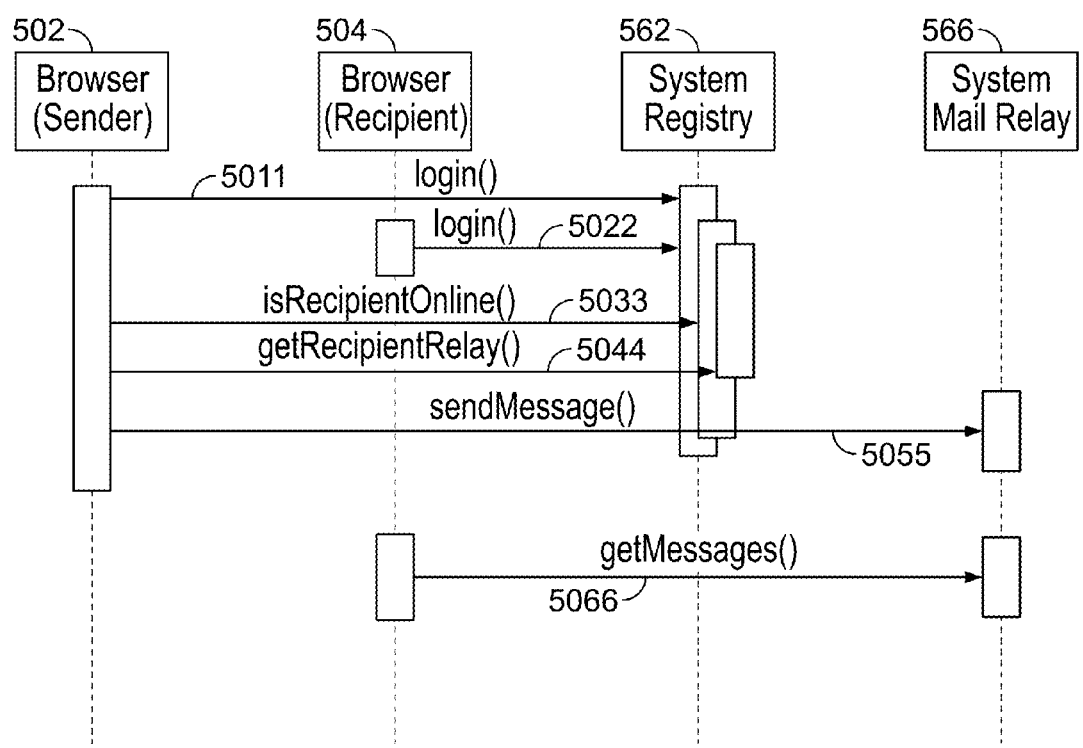
FIG. 5 shows an example system and method for delivering confidential instant messages to a receiving computer using a browser application.

FIG. 5 shows an example method for delivering confidential instant messages (IM) to a receiving computer using a browser application in a system of the claimed invention. In this example, a user does not need to install an email plug-in or an IM plug-in and can use a browser to send and receive secure IMs. For example, a user on a sending computer 102 that wants to send a private IM uses the browser 502 of sending computer 102 to open a web based private email page in block 5011. A login or other verification can be used to pass credentials to the system registry 562 to confirm that both the sender and recipient are peer network members.

In block 5022, the sender's web based private IM page authenticates to the system registry 562. For example, the sending computer 102 can send a login( ) process to the system registry 562 to be authenticated. By providing authentication to the sending computer 102, the system registry 562 confirms that the user of the sending computer 102 is a registered user and is in compliance with any qualifications for using the system of the claimed invention.

In block 5033 the sender's web based private IM page notifies the system registry 562 that the sending computer 102 is on line. For example, the sending computer 102 can send a isRecipientOnline( ) process to the system registry 562 to provide notification. In block 5044 the sender's web based private IM page uses the browser 502 of the sending computer 102 and receives the location of the system mail relay 566 of the receiver of the IM from the system registry 562. For example, the browser polls the relay and then receives the information from the relay. Once the browser 502 of the sending computer 102 has the location of the system mail relay 566 of the receiving computer 104, the browser 502 of the sending computer 102 then sends the private IM to the system mail relay 566 of the receiving computer 104 in block 5055. For example, the sending computer 102 can send a isRecipientOnline( ) process to the system registry 562 to provide notification. Once the system mail relay 566 receives the private IM from the browser 502 of the sending computer 102, the system mail relay 566 relays the IM to the browser 504 of the receiving computer 104 in block 5066, and the web based private IM page of the receiving computer 104 receives the private message.

FIG. 6 shows an example system and method for accessing confidential electronic documents using remote mail access. Often, users want to retrieve a confidential electronic document, and they do not have access to their home computer or computing device in which a plug-in application in accordance with the claimed invention is installed. A user wants to access his email from any computer. In these instances, a user electronic mail relay can be directly addressable.

In the example of FIG. 6, a user can securely send and receive electronic documents from a remote computing device. For example, a user on a sending computer 102 that wants to send a private electronic document uses the browser 602 of sending computer 102 to authenticate to the system registry 662. For example, in block 6011 the sending computer 102 can use a web based private email page to send a login( ) process to the system registry 662 to be authenticated. By providing authentication to the sending computer 102, the system registry 662 confirms that the user of the sending computer 102 is a registered user and is in compliance with any qualifications for using the system of the claimed invention.

In block 6022 the system registry 662 sends the location of a system mail relay 666 to be used by the browser 602 of sending computer 102 for the electronic document exchange. For example, the system registry 662 can respond to a process getMyRelay( ) to provide the location of the system mail relay 666 to be used. In block 6033, the browser 602 of sending computer 102 uses the web based private email page to request message delivery for the system mail relay 666. This can be executed by sending a getMessages( ) process from the browser 602 to the system mail relay 666.

In block 6044, the system mail relay 666 responds to the getMessages( ) process by retrieving private electronic documents from the system mail service 658. For example, the system mail service can execute a getFilesFromMessagesBox( ) process as illustrated in FIG. 6. In block 6055, the system mail service 658 retrieves messages from the mail registry 656. As outlined above, mail registry 656 can be a mailbox, inbox, outbox or other directory, folder, or storage location where email is stored before and/or after being sent. The system mail service 658 then sends the private electronic documents to the system mail relay 666 in block 6066. The browser 602 of sending computer 102 uses the web based private email page to retrieve the private electronic documents from the system mail relay 666 as shown in block 6077.

FIG. 7 illustrates an example system and method highlighting the process of remotely sending private mail messages. Similarly to FIG. 6, users often want to send a confidential electronic document, and they do not have access to their home computer or computing device in which a plug-in application in accordance with the claimed invention is installed. A user wants to send private emails from any computer. As above, in these instances, a user electronic mail relay can be directly addressable.

In the example of FIG. 7, a user can securely send and receive electronic documents from a remote computing device. For example, a user on a sending computer 102 that wants to send a private electronic document uses the browser 702 of sending computer 102 to create a private email message and sends the message to the system mail relay 766 of the sending computer 102. For example, in block 7011 the sending computer 102 can use a web based private email page to send a sendMail( ) process to the system mail relay 766. Upon receiving the private message, the system mail relay 766 sends the private message to the system mail service 758 of the sending computer 102 as illustrated in block 7022 of FIG. 7.

When the system mail service 758 receives the private message, the system mail service 758 forwards the private message to the email registry 756, which could be the sender's email client or email reading software as described above. This effectively places the private message in to the outbox of the sending computer 102. For example, as shown in block 7033 of FIG. 7, the system mail service 758 can execute a putMailintoOutboxFolder( ) process to effect these actions.

Once the private message is in the outbox of the sending computer 102, the system mail service 758 accesses the system registry 762 in block 7044 to determine the mail relay location 796 of the receiving computer 104. In block 7055, the system mail service 758 sends the private email message to the mail relay location 796 of the receiving computer 104. The system mail service 758 then forwards the message via the system mail relay 766 of the sending computer 102 (in block 7066) to the web based private email page in the browser 702 of the sending computer 102 (in block 7077).

The sending computer 102 and receiving computer 104 in these examples can run interface applications such as web browsers and others that can provide an interface to make requests for (and send data to) different web server-based applications via the computer network 199. A series of applications and services can run on the sending computer 102 and receiving computer 104 that allow the transmission of data requested by (alternatively) the sending computer 102 and receiving computer 104. The sending computer 102 and receiving computer 104 can provide data or receive data in response to requests directed toward the respective applications on the respective sites. In accordance with the transmission control protocol (TCP), packets can be sent to the receiving computer 104 from the sending computer 102. The packets from the sending computer 102 and receiving computer 104 can include requests for the transmission of data. It is to be understood that the applications and services on sending computer 102 and receiving computer 104 can be hardware or software and that sending computer 102 and receiving computer 104 can represent sites with a single computing device or with multiple computing devices, which can include internal or external networks. Further, additional computers, sites, and servers can be coupled to the computer network 199, and many different types of applications can be available on computers, sites, and servers coupled to the computer network 199.

Generally, client devices such as the sending computer 102 and receiving computer 104 can include any computing device capable of connecting to another computing device to send and receive information, including web-based information. As outlined above, the set of such devices can include devices that typically connect using a wired and/or a wireless communications medium, such as personal computers, desktops, laptops, mobile phones and/or smart phones, and the like. In these examples, the client devices can run web browsers that can provide an interface to make requests to different web server-based applications via the computer network 199. A series of web-based applications can run on the sending computer 102 and receiving computer 104 that allow the transmission of data requested by each other and by other computing devices. The sending computer 102 and receiving computer 104 can be further configured to engage in a secure communication with other devices coupled to the computer network 199 including additional computers, sites, and servers. Additional secure communications can be effected using mechanisms such as Secure Sockets Layer (SSL), Internet Protocol Security (IPSec), Tunnel Layer Security (TLS), and the like.

In one example, the private document delivery system 100 includes sending computer 102 and receiving computer 104, although the system 100 can include other types of private and public networks that include other devices. Communications, such as requests from sending computer 102 and receiving computer 104 and responses from each take place over the computer network 199 according to standard network protocols, such as the HTTP and TCP/IP protocols, but the principles discussed are not limited to this example and can include other protocols.

Further, the system 100 can include local area networks (LANs), wide area networks (WANs), direct connections and any combination thereof, other types and numbers of network types. On an interconnected set of LANs or other networks, including those based on different architectures and protocols, routers, switches, hubs, gateways, bridges, and other intermediate network devices can act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts. In essence, the computer network 199 includes any communication medium and method by which data can travel between sending computer 102 and receiving computer 104, and these example configurations are provided by way of example only.

Each of the computers 102, 104, 110, 120 can include a central processing unit (CPU), controller or processor, a memory, and an interface system which are coupled together by a bus or other link, although other numbers and types of each of the components and other configurations and locations for the components can be used.

Figure 8:
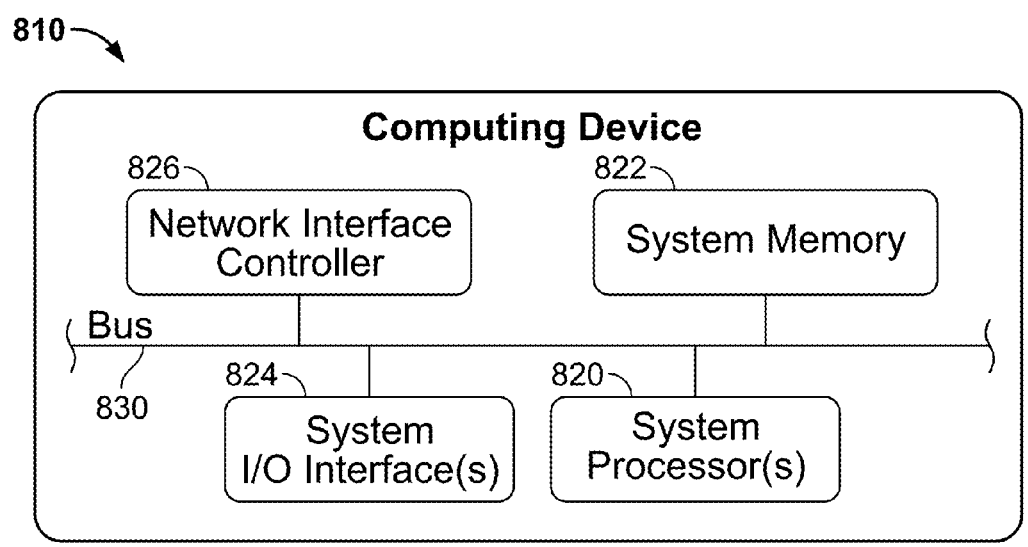
FIG. 8 shows an example confidential electronic document computing device in accordance with the claimed invention.

As shown further in FIG. 8, the confidential electronic document computing devices of the claimed invention, including sending computer, receiving computer, signaling mechanism, presence monitoring tool, and verification agent computer are shown as an example "computing device" 810. Computing device 810 includes system processor(s) 820, system memory 822, system I/O interface(s) 824, and network interface controller 826, which are coupled together by a bus 830 or other numbers and types of links, although the confidential electronic document computing devices 810 can include other components and elements in other configurations. In this example, the confidential electronic document computing device 810 is implemented as a standalone device, although the confidential electronic document computing devices 810 could be implemented as blade devices in a chassis-blade implementation, for example.

System processor 820 includes one or more microprocessors configured to execute computer/machine readable and executable instructions stored in system memory 822 to implement automatic sending and receiving of confidential electronic documents on a client server network system, such as system 100, for example. When executed by at least one processor, the instructions stored in system memory 822 cause the processor 820 to automatically send and receive confidential electronic documents. The instructions on the computer readable medium, including system memory 822, further cause the processor 820 to perform steps including sending a confidential electronic document between a sending computer 102 and a receiving computer 104.

The system processor 820 is configured to execute computer/machine readable and executable instructions stored in system memory 822 to implement one or more portions of the processes described above and further below in connection with FIGS. 1-7, for example, although processor 820 can comprise other types and/or combinations of processors, such as digital signal processors, micro-controllers, switch chips, bus controllers, application specific integrated circuits ("ASICs"), programmable logic devices ("PLDs"), field programmable logic devices ("FPLDs"), field programmable gate arrays ("FPGAs"), and the like, programmed or configured according to the teachings as described and illustrated with respect to FIGS. 1-7.

System memory 822 includes computer readable media, namely computer readable or processor readable storage media, which are examples of machine-readable storage media. Computer readable storage/machine-readable storage media can include volatile, nonvolatile, removable, and non-removable media implemented in any method or technology for storage of information, such as computer readable/machine-executable instructions, data structures, program modules, or other data, which can be obtained and/or executed by one or more processors, such as system processor 820, to perform actions, including implementing an operating system for controlling the general operation of confidential electronic document computing device 810 to automatically send a confidential electronic document in accordance with the processes described above in connection with FIGS. 1-7, for example.

Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other medium which can be used to store the desired information, including data and/or computer-executable instructions or other machine-executable instructions, and which can be accessed by a computing or specially programmed device, such as confidential electronic document computing devices 810. When the instructions stored in system memory 822 are run by the system processor 820, the confidential electronic document computing device 810 implements at least a portion of the processes described further below to send confidential electronic documents in connection with FIGS. 1-7, in addition to the various client-server management related functions, including redundancy functions, version controls, server load balancing functions, device configuration functions (e.g., defining network security policies), VPN hosting, network traffic management, loss control, and other functions.

System I/O interface(s) 824 includes one or more user input and output device interface mechanisms, such as a computer keyboard, mouse, display device, and the corresponding physical ports and underlying supporting hardware and software to enable the confidential electronic document computing devices 810 to communicate with the outside environment for accepting user data input and to provide user output, although other types and numbers of user input and output devices can be used. Alternatively or in addition, as will be described in connection with network interface controller 826 below, the confidential electronic document computing devices 810 can communicate with the outside environment for certain types of operations (e.g., configuration) via a network management port, for example.

Network interface controller 826 provides physical access to a networking medium and provides a low-level addressing system, which enables the confidential electronic document computing devices 810 to engage in TCP/IP communications over network system 100 (shown in FIG. 1) and to automatically deliver confidential documents to receiving computers and to maintain application services although the network interface controller 826 can be constructed for use with other communication protocols and types of networks, and can include other components, and can perform other functions. Network interface controller 826 is sometimes referred to as a transceiver, transceiving device, or network interface card (NIC), which transmits and receives network data packets to one or more networks, such as system 100 in this example. When the confidential electronic document computing device 810 includes more than one system processor 820 (or a processor 820 has more than one core), each processor 820 (and/or core) can use the same single network interface controller 826 or a plurality of network interface controllers 826. Further, the network interface controller 826 can include one or more physical ports, such as Ethernet ports, to couple the confidential electronic document computing devices 810 with other network devices, such as servers and other sites. Additionally, the network interface controller 826 can include certain physical ports dedicated to receiving and/or transmitting certain types of network data, such as device management related data for configuring the confidential electronic document computing devices 810.

In one example, the network interface controller 826 is an FPGA that can include a local memory and be configured with logic to implement one or more aspects of the technology, including by way of example only, automatically sending and receiving confidential electronic documents, although the network interface controller 826 can include other types of configurable hardware, such as digital signal processors, micro-controllers, ASICs, PLDs, FPLDs, and the like, programmed or configured according to the teachings as described and illustrated herein with respect to FIGS. 1-7, as well as software executed by the system processor 820, combinations thereof, and other components and elements configured in other manners which could implement one or more aspects of the technology. The use of specialized hardware in this example allows the network interface controller 826 to rapidly process network data packets.

Bus 830 includes at least one internal device component communication bus, link, bridge and supporting components, such as bus controllers and/or arbiters. These devices enable the various components of the confidential electronic document computing device 810, such as the system processor 820, system memory 822, system I/O interface 824, and network interface controller 826, to communicate, although the bus 830 can enable one or more components of the confidential electronic document computing device 810 to communicate with components in other devices as well. By way of example only, example buses include Hyper-Transport, PCI, PCI Express, InfiniBand, USB, Firewire, Serial ATA (SATA), SCSI, IDE and AGP buses, although other types and numbers of buses can be used, and the particular types and arrangement of buses will depend on the particular configuration of confidential electronic document computing device 810.

While each of the computers and verification agent can include the processor 820, memory 822, network interface controller 826, and I/O interface 824 coupled together by a bus 830, two or more computing systems or devices can be substituted for any one of the devices in the system 100. Accordingly, principles and advantages of distributed processing, such as redundancy, replication, and the like, also can be implemented as desired to increase the robustness and performance of the devices and systems of the system 100. The system 100 can also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

As outlined above, each of the client computers, sites, and servers can include a central processing unit (CPU), controller or processor, a memory, and an interface which are coupled together by a bus or other link, although other numbers and types of each of the components and other configurations and locations for the components can be used. The processors in the computing devices can execute a program of stored instructions for one or more aspects of the methods and systems as described herein, although the processor could execute other types of programmed instructions. The memory can store these programmed instructions for one or more aspects of the methods and systems as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory. The user input device can include a computer keyboard and a computer mouse, although other types and numbers of user input devices can be used. The display can include a computer display screen, such as a CRT or LCD screen by way of example only, although other types and numbers of displays could be used.

Although an example of the confidential electronic document computing devices 810 are described and illustrated in connection with FIG. 8, each of the computers and computing devices of the system 100 could be implemented on any suitable computer system or computing device. It is to be understood that the example devices and systems of the system 100 are for exemplary purposes, as many variations of the specific hardware and software used to implement the system 100 are possible, as will be appreciated by those skilled in the relevant art(s).

Further, each of the devices of the system 100 can be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like, programmed according to the teachings as described and illustrated herein, as will be appreciated by those skilled in the computer, software, and networking arts.

The operation of example processes to provide a system and method of delivering confidential electronic files shown in FIGS. 1-7 can be run on the private document delivery system 100. The flow diagrams of FIGS. 1-7 are representative of example machine readable instructions for implementing the process of delivering confidential electronic files. The steps described above are example machine readable instructions for implementing a method in accordance with the examples described in this disclosure. In one example, the machine readable instructions include an algorithm for execution by: (a) a processor, (b) a controller, and/or (c) one or more other suitable processing device(s). The algorithm can be instantiated in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or in dedicated hardware in a known manner. For example, the algorithm can be implemented by an application specific integrated circuit (ASIC), a programmable logic device (PLD), a field programmable logic device (FPLD), a field programmable gate array (FPGA), discrete logic, etc.). For example, any or all of the components of the private document delivery system could be implemented by software, hardware, and/or firmware. Also, some or all of the machine readable instructions described herein can be implemented manually. Further, although an example of the present invention is described and illustrated herein, persons of ordinary skill in the art will readily appreciate that many other methods of implementing the example machine readable instructions can alternatively be used. For example, the order of execution can be changed, and/or some of the steps described can be changed, eliminated, or combined.

By performing a method of delivering confidential electronic files using a system described above, if a sender wishes to send a confidential electronic document, such as an email, message, document, or attachment, a direct path for the transmission and reception of the restricted electronic document is accomplished and the document is delivered securely.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as can be specified in the claims. Accordingly, the invention is limited only by the following claims and equivalents thereto.

What is claimed is:

1. A method of resolving a communications path and sending a private message from a sending computer under the physical possession of a sender to a receiving computer under the physical possession of a receiver over a computer network, the method comprising:
    identifying, with a system registry, the receiving computer to which the private message is sent;
    determining, with the system registry, that the receiving computer is not a member of a private messaging network that includes the sending computer;
    upon determining that the receiving computer is not a member of a private messaging network that includes the sending computer,
        storing the private message on a mail service of the sending computer;
        sending a notification message to the receiving computer via a public email relay, wherein the notification message includes an embedded link that upon activation launches a system web client on the receiving computer that contacts the system registry to locate the network management service that provides location information of the mail service of the sending computer to the receiving computer;
        transmitting location information updates of the mail service of the sending computer to the network management service;
        connecting the receiving computer to the network management service;
        receiving, with the receiving computer, location information of the mail service of the sending computer from the network management service;
        connecting the receiving computer to the mail service of the sending computer using the location information received from the network management service; and
        pulling the private message from the mail service of the sending computer to the receiving computer.

2. The method of claim 1 further comprising:
    determining, with the system registry, that the private message requires verification;
    upon determining that the private message requires verification:
        sending, with the system web client, receiving computer information to a verification agent;
        receiving an indication that the receiving computer information passes verification criteria.

3. The method of claim 1, wherein accessing the link activates a service at the system registry that dynamically locates the mail service of the sending computer and connects the sending computer and the receiving computer via an encrypted channel.

4. The method of claim 1 further comprising:
    determining, with a network management service, that the sending computer is not directly addressable to release the private message to the receiving computer;
    upon determining that the sending computer is not directly addressable:
        dynamically marshaling a peer relay that provides an encrypted channel between the sending computer and the receiving computer when the sending computer is not directly addressable, wherein the peer relay is a member of a private messaging network that includes the sending computer and is dynamically determined at the time of message release to the receiving computer; and
        releasing the private message to the receiving computer via the encrypted channel established by the peer relay between the sending computer and the receiving computer when the receiving computer pulls the private message from the sending computer.

5. The method of claim 4, wherein the encrypted channel comprises:
    a sender-relay encrypted channel between the sending computer and the relay;
    a relay-receiver encrypted channel between the relay and the receiving computer; and
    wherein the private message is not persisted on the relay.

6. The method of claim 4, wherein the encrypted channel provides no persistent copy and storage of the private message by an intermediary device.

7. The method of claim 1, wherein the sending computer is a peer mobile device and the network management service dynamically tracks network attachment status of the sending computer, direct addressability status of the sending computer and the receiving computer, and on-line status of the receiving computer.

8. The method of claim 7, wherein the peer mobile device is a smartphone.

9. A method of resolving a communications path and sending a private message from a sending computer under the physical possession of a sender to a receiving computer under the physical possession of a receiver over a computer network via a mobile mail server, the method comprising:
    identifying a first network attachment status of a mobile mail server of the sending computer that includes at least one of a first Wi-Fi-link and a first cellular-link to the computer network;
    assessing speed and reliability characteristics of the communications path based upon the identified first network attachment status of the mobile mail server of the sending computer;
    identifying a second network attachment status of the mobile mail server of the sending computer different than the first network attachment status indicative of a change in network address of the mobile mail server of the sending computer, wherein the second network attachment status includes at least one of a second Wi-Fi link and a second cellular-link to the computer network different than the at least one first Wi-Fi link and the first cellular-link;
    creating and maintaining an encrypted channel from the mobile mail server of the sending computer to the receiving computer through the changed attachment status of the mobile mail server of the sending computer;

assessing speed and reliability characteristics of the encrypted channel based upon the identified second network attachment status of the mobile mail server of the network management service; and enforcing a private message policy based on the assessed speed and reliability characteristics of the communications path and the encrypted channel through a presence monitoring tool of the network management service, wherein the presence monitoring tool collects updated address information from the mail server of the sending computer and from the receiving computer and sends the updated address information to the mail server of the sending computer and to the receiving computer during message transmission so that the mobile mail server of the sending computer and the receiving computer reconnect using the updated address information and resume message transmission in event of a transmission interruption.

10. The method of claim 9, wherein the enforced private message policy includes a message size policy.

11. The method of claim 4, wherein the network management service determines that the sending computer is not directly addressable using a mail service component of the network management service.

12. The method of claim 1, wherein determining that the receiver is not a member of the private message network includes:
identifying, with the system registry, a receiving computer user profile indicative of non-membership in the private message network of the sending computer.

13. The method of claim 12, wherein the receiving computer user profile includes:
an electronic mail delivery address of the receiving computer; and
an indication that private message network delivery software is not installed on the receiving computer.

14. The method of claim 1, further comprising:
tracking, with the network management service, on-line status of the receiving computer;
determining, with the system registry, that the receiving computer is not online; and
upon determining that the receiving computer is not online:
storing the private message on a mobile mail server of the sending computer; and
polling the receiving computer until the receiving computer is online.

15. The method of claim 14, wherein the on-line status includes an IP address.

16. The method of claim 1 further comprising:
determining, with the network management service, that the receiving computer is not directly addressable by the sending computer;
upon determining that the receiving computer is not directly addressable:
returning, with the mail service of the sending computer, a location of a system mail relay to the system registry;
pulling the private message to the receiver via the system mail relay.

17. The method of claim 14, further comprising:
tracking, with the network management service, on-line status of the sending computer after storing the private message on the mobile mail server of the sending computer;

determining, with a presence monitoring tool, that the mobile mail server of the sending computer is not online; and
upon determining that the mobile mail server of the sending computer is not online:
polling the mobile mail server of the sending computer with the network management service when the receiving computer is back on-line;
determining that the mobile mail server of the sending computer is directly addressable using a mail service component of the network management service.

18. The method of claim 17, wherein the on-line status of the sending computer includes an IP address.

19. A computer system that resolves a communications path and sends a private message from a sending computer under the physical possession of a sender to a receiving computer under the physical possession of a receiver over a computer network, the system comprising:
a system registry that identifies the receiving computer to which the private message is sent and determines that the receiving computer is not a member of a private messaging network that includes the sending computer, and upon determining that the receiving computer is not a member of a private messaging network that includes the sending computer, stores the private message on a mail service of the sending computer;
a public email relay that receives a notification from a mail service of the sending computer and sends a notification message to the receiving computer, wherein the notification message includes an embedded link that upon activation launches a system web client on the receiving computer that contacts the system registry to locate the network management service of the sending computer;
wherein the network management service receives location information updates of the mail service of the sending computer and connects to the receiving computer and provides location information of the mail service of the sending computer to the receiving computer; and
wherein the system web client in the receiving computer connects to the mail service of the sending computer using the location information received from the network management service and pulls the private message from the mail service of the sending computer.

20. A computer system of claim 19, wherein
the network management service is further configured to track on-line status of the receiving computer; and
the system registry is further configured to determine that the receiving computer is not online and upon determining that the receiving computer is not online stores the private message on a mobile mail server of the sending computer and polls the receiving computer until the receiving computer is on line.

21. A computer system of claim 19, wherein the network management service is further configured
to determine that the sending computer is not directly addressable to release the private message to the receiving computer;
to dynamically marshal a peer relay that provides an encrypted channel between the sending computer and the receiving computer when the sending computer is not directly addressable, wherein the peer relay is a member of a private messaging network that includes the sending computer and is dynamically determined at the time of message release to the receiving computer; and to release the private message to the receiving computer via the encrypted channel established by the peer relay between the sending computer and the receiving computer when the receiving computer pulls the private message from the sending computer.

22. A computer system of claim 19, wherein the network management service is further configured to determine that the receiving computer is not directly addressable by the sending computer and, upon determining that the receiving computer is not directly addressable, returning a location of a mobile mail server to the system registry, and pulling the private message to the receiver via the mobile mail server.

* * * * *